(12) United States Patent
Li

(10) Patent No.: US 11,604,404 B2
(45) Date of Patent: Mar. 14, 2023

(54) LAMP PROJECTING STARRY SKY AND NEBULA GENERATION METHOD THEREOF

(71) Applicant: Lonvis Technology (Shenzhen) Co., Ltd., Shenzhen (CN)

(72) Inventor: Xuequan Li, Shenzhen (CN)

(73) Assignee: Lonvis Technology (Shenzhen) Co., Ltd., Shenzhen (CN)

(*) Notice: Subject to any disclaimer, the term of this patent is extended or adjusted under 35 U.S.C. 154(b) by 0 days.

(21) Appl. No.: 17/837,105

(22) Filed: Jun. 10, 2022

(65) Prior Publication Data

US 2022/0299858 A1 Sep. 22, 2022

Related U.S. Application Data

(63) Continuation-in-part of application No. 17/183,381, filed on Feb. 24, 2021, now Pat. No. 11,378,879.

(30) Foreign Application Priority Data

Feb. 4, 2021 (CN) .......................... 202110156576.7

(51) Int. Cl.
*G03B 21/28* (2006.01)
*G02B 5/18* (2006.01)
(Continued)

(52) U.S. Cl.
CPC ................ *G03B 21/28* (2013.01); *F21V 5/08* (2013.01); *G02B 5/1814* (2013.01); *G03B 21/142* (2013.01); *F21W 2121/008* (2013.01)

(58) Field of Classification Search
None
See application file for complete search history.

(56) References Cited

U.S. PATENT DOCUMENTS

2007/0109504 A1* 5/2007 Miyazawa ............. G03B 21/16
348/E9.027
2007/0296923 A1 12/2007 Lee
(Continued)

FOREIGN PATENT DOCUMENTS

CN 101276523 B 10/2010
CN 108613048 A * 10/2018
(Continued)

*Primary Examiner* — Bao-Luan Q Le
*Assistant Examiner* — Danell L Owens
(74) *Attorney, Agent, or Firm* — Bayramoglu Law Offices LLC

(57) ABSTRACT

A lamp projecting a starry sky is provided. The lamp projecting the starry sky includes at least one beam generator, a reflecting member with uneven and irregular reflecting surface, a first motor, and at least one first lens. The first motor is connected to the reflecting member through a connecting shaft, the reflecting member is driven to rotate when the first motor rotates, a light beam generated by the beam generator irradiates onto a first side of the reflecting member along an incident light path, and a light beam emitted from the reflecting member forms a moving and layering nebula projection after passing through the at least one first lens. In the lamp, after passing from the reflecting member, the light beam is magnified by the lens, so that the generated starry sky will not be too bright and dazzling, which effectively enhances the layering sense of the starry sky.

19 Claims, 19 Drawing Sheets

(51) Int. Cl.
*G03B 21/14* (2006.01)
*F21V 5/08* (2006.01)
*F21W 121/00* (2006.01)

(56) References Cited

U.S. PATENT DOCUMENTS

| | | | | |
|---|---|---|---|---|
| 2009/0175042 A1* | 7/2009 | Chien | ................... | F21V 14/02 |
| | | | | 362/235 |
| 2017/0146218 A1 | 5/2017 | Di Trapani | | |
| 2018/0136552 A1* | 5/2018 | Kobayashi | ........... | H04N 9/3194 |

FOREIGN PATENT DOCUMENTS

| CN | 108613048 A | 10/2018 |
|---|---|---|
| CN | 211875895 U | 11/2020 |

* cited by examiner

LAMP PROJECTING STARRY SKY AND NEBULA GENERATION METHOD THEREOF

CROSS REFERENCE TO THE RELATED APPLICATION

This application is a continuation-in-part application of the U.S. patent application Ser. No. 17/183,381, filed on Feb. 24. 2021, which claims priority to Chinese Patent Application No. 202110156576.7, filed on Feb. 4, 2021, the entire contents of which are incorporated herein by reference.

TECHNICAL FIELD

The present application relates to the field of a projection lamp, and in particular, to a lamp projecting a starry sky and a nebula generation method for the above lamp projecting a starry sky.

BACKGROUND

A lamp projecting a starry sky is a projecting device which can produce dynamic nebula effect, it is often used as an ambient light in houses, automobiles, and entertainment venues and so on. A lamp projecting a starry sky usually produces dynamic nebula effect by means of a light beam irradiating onto a rotating interference disk, even can even simulate star twinkling and other actions.

A Chinese Patent Document CN101276523B (publication number) discloses a projection device for producing a moving starry sky and cloud-like effect, including: a device for generating cloud-like effect using at least one incoherent light source, a device for generating a moving starry sky using at least one coherent light source, and a device for regulating and providing electric power. The device for generating cloud-like effect using at least one incoherent light source comprises at least a pair of condenser lenses and an interference filter disk rotated by a motor, the interference filter disk is placed between the at least a pair of condenser lenses. The device for generating a moving starry sky using the coherent light source comprises a grating disk rotated by a motor and a diffractive optical element placed between the at least one coherent light source and the grating disk. A Chinese Patent Document CN108613048A (publication number) discloses a lamp projecting a starry sky, including: a light source, a focusing lens, an image sheet, beam splitting unit, a collimating lens and an array of reflecting mirrors in sequence along a light path. The beam splitting unit can divide a light beam into multiple sub-beams with different propagation angles, different sub-beams are collimated by the collimating lens and then irradiate onto the array of reflecting mirrors, at the same time, the array of reflecting mirrors comprises a plurality of small reflecting mirrors, thus, when the number of small reflecting mirrors included in the array of reflecting mirrors is limited, the number of projection images is increased and the illumination area is enlarged. All of the abovementioned patents use the light beam to directly pass through the rotating interference disk for producing dynamic nebula effect, which is likely to cause a part with large light intensity to be too bright and dazzling, being not conducive to viewing dynamic changes of the nebula for a long time.

SUMMARY

In order to overcome defects in the prior art, the present invention provides a lamp projecting a starry sky, after multiple refractions, reflection and refraction, a light beam therein is magnified by a lens, so that the generated starry sky will not be too bright and dazzling, and the transition of images will have a better softness, which effectively enhances the layering sense of the starry sky.

In order to achieve the above objectives, the following technical solution is adopted by the present invention:

The present invention provides a lamp projecting a starry sky, comprising:

at least one beam generator;

an interference filter, configured to produce nebula effect; the beam generator is placed on a side of the interference filter, a light beam generated by the beam generator irradiates onto the side of the interference filter along an incident light path;

a reflecting mirror, placed on the other side of the interference filter; after the interference filter is irradiated by the light beam, light in the light beam passes through the interference filter after being subjected to 1) a reflection, or 2) a refraction, a reflection and a refraction in sequence, or 3) a refraction, multiple reflections and a refraction in sequence under action of the interference filter and the reflecting mirror;

at least one first lens, located on an emergent light path of the interference filter; the light beam emitted from the interference filter forms a moving and layering nebula projection after passing through the at least one first lens.

In a further embodiment of the present invention, the lamp projecting a starry sky further comprises: a fixed cylinder and a first motor; the interference filter is fixed at an opening at one end of the fixed cylinder, and the reflecting mirror is located between the interference filter and a slot bottom of the fixed cylinder, a power output shaft of the first motor is connected with the slot bottom; when the first motor runs, the fixed cylinder rotates to drive the interference filter and the reflecting mirror to rotate.

In a further embodiment of the present invention, the lamp projecting a starry sky further comprises: a connecting shaft connected with the first motor; the first motor is connected to the interference filter through the connecting shaft, and the reflecting mirror is located on a side of the connecting shaft, a central axis of the reflecting mirror is parallel to the connecting shaft, when the first motor runs, the connecting shaft drives the interference filter to rotate, and the reflecting mirror stands still.

In a further embodiment of the present invention, the lamp projecting a starry sky further comprises: a motor control unit, configured to control a rotation speed and a rotation period of the first motor; the motor control unit controls the first motor to adjust a movement speed of the nebula in the nebula projection.

In a further embodiment of the present invention, the beam generator comprises a first light source and a condenser cup; the light generated by the first light source generates the light beam after light condensing action of the condenser cup, the light beam irradiates onto the side of the interference filter along an incident light path.

In a further embodiment of the present invention, the lamp projecting a starry sky further comprises: a first light source control unit, configured to control light intensity of the first light source; the first light source control unit controls the first light source to adjust brightness of the nebula in the nebula projection.

In a further embodiment of the present invention, a central axis of the condenser cup is perpendicular to a central axis of the at least one first lens; the central axis of the reflecting mirror is parallel to or coincides with a central axis of the interference filter; the angle between the central axis of the interference filter and the central axis of the first lens is 30°-50°; a projection of an incident light beam is located at a lower part of a side of the interference filter, a projection of an emergent light beam is located at an upper part of a side of the interference filter, and the at least one first lens is located on the emergent light beam.

In a further embodiment of the present invention, the lamp projecting a starry sky further comprises: a star projector, configured to produce star effect; a projection of stars generated by the star projector is projected on the nebula projection to form a starry sky projection.

In a further embodiment of the present invention, the star projector comprises a grating sheet and a laser diode; the light beam generated by the laser diode is projected on the grating sheet to produce the projection of stars.

In a further embodiment of the present invention, the star projector comprises a second motor, a first grating sheet, a second grating sheet and the laser diode; a power output end of the second motor is connected with the second grating sheet, so as to drive the second grating sheet to rotate; the light beam emitted by the laser diode sequentially passes through the first grating sheet and a portion of the second grating sheet which is rotating, so as to produce the projection of stars which are moving.

In a further embodiment of the present invention, the lamp projecting a starry sky further comprises: a motor control unit, configured to control a rotation speed and a rotation period of the second motor; the motor control unit controls the second motor to adjust a movement speed of stars in the projection of stars.

In a further embodiment of the present invention, the lamp projecting a starry sky further comprises: a second light source control unit, configured to control the laser diode; the second light source control unit controls the laser diode to adjust brightness of the stars in the projection of stars.

In a further embodiment of the present invention, the star projector comprises a third motor, a hole-shaped light blocking sheet, a third grating sheet, a fourth grating sheet and the laser diode; a power output end of the third motor is connected with the hole-shaped light blocking sheet, so as to drive the hole-shaped light blocking sheet to rotate; the light beam emitted by the laser diode sequentially passes through the third grating sheet, the hole-shaped light blocking sheet which is rotating, and the fourth grating sheet, so as to produce the projection of stars which are twinkling.

In a further embodiment of the present invention, the lamp projecting a starry sky further comprises: a motor control unit, configured to control a rotation speed and a rotation period of the third motor; the motor control unit controls the third motor to adjust a twinkling frequency of stars in the projection of stars.

In a further embodiment of the present invention, the lamp projecting a starry sky further comprises: a fourth motor; the fourth motor drives the third grating sheet and/or the fourth grating sheet to rotate; the light beam emitted by the laser diode sequentially passes through the third grating sheet which is rotating, the hole-shaped light blocking sheet which is rotating, and the fourth grating sheet, so as to produce the projection of stars which are twinkling and rotating; or the light beam emitted by the laser diode sequentially passes through the third grating sheet, the hole-shaped light blocking sheet which is rotating, and the fourth grating sheet which is rotating, so as to produce the projection of stars which are twinkling and moving.

In a further embodiment of the present invention, the lamp projecting a starry sky further comprises: an image projector, configured to produce images; images generated by the star projector are projected on a nebula projection or a starry sky projection, so as to form the nebula projection or the starry sky projection with images.

In a further embodiment of the present invention, the image projector comprises a slide for generating images, at least one second lens, a condensing lens and a second light source; the light generated by the second light source generates the light beam after light condensing action of the condensing lens, the light beam irradiates onto the slide and is enlarged by at least one second lens to form images.

In a further embodiment of the present invention, the lamp projecting a starry sky further comprises: an alternating current (AC)/direct current (DC) conversion unit; the AC/DC conversion unit supplies power to the motor control unit and the light source control unit after being rectified by its rectifier circuit.

In a further embodiment of the present invention, a focal point of the at least one first lens is located on a side of the interference filter.

The present invention further provides a nebula generation method for the lamp projecting a starry sky, comprising the following steps:

S00: the first motor driving the interference filter and the reflecting mirror, which are used to produce nebula effect, to rotate;

S10: a light beam generated by the beam generator irradiating onto the side of the interference filter which is rotating; after the side of the interference filter is irradiated by the light beam, light in the light beam passes through and emits from the side of the interference filter after being subjected to 1) a reflection, or 2) a refraction, a reflection from the reflecting mirror and a refraction in sequence, or 3) a refraction, multiple reflections from the reflecting mirror and the other side of the interference filter and a refraction in sequence under action of the interference filter and the reflecting mirror;

S20: the light beam emitted from the one side of the interference filter forming a moving and layering nebula projection after passing through the at least one first lens, and projecting the nebula projection onto a projected body.

The beneficial effects of the present invention include:

In the lamp projecting a starry sky provided by the present invention, the light beam generated by the beam generator irradiates onto the side of the interference filter along an incident light path, light in the light beam passes through and emits from the side of the interference filter after being subjected to 1) a reflection, or 2) a refraction, a reflection from the reflecting mirror and a refraction in sequence, or 3) a refraction, multiple reflections from the reflecting mirror and the other side of the interference filter and a refraction in sequence under action of the interference filter and the reflecting mirror; the light beam is magnified by the lens, so that the generated starry sky will not be too bright and dazzling, and the transition of images will have a better softness, which effectively enhances the layering sense of the starry sky. In the lamp projecting a starry sky provided by the present invention, since the incident light beam will cover most of the interference filter and the incident light beam is perpendicular to the emergent light, the area utilization rate of the interference filter is higher, which is conducive to making the lamp projecting a starry sky have a more proper arrangement and a compacter structure. For example, in the projection device for producing a moving starry sky and cloud-like effect disclosed by CN101276523B (publication number), particularly, the light source, the condenser lens, the interference filter disk and the magnifying lens are distributed vertically, obviously they will occupy larger space, the utilization rate of the interference disk is low, and it needs a larger interference disk to project the image with the same area.

In order to achieve the above objectives, the following technical solution is also adopted by the present invention:

The present invention provides a lamp projecting a starry sky, comprising:

at least one beam generator;

a reflecting member, a reflecting surface of the reflecting member is uneven and irregular;

a first motor connected to the reflecting member through a connecting shaft, the reflecting member is driven to rotate when the first motor rotates;

the beam generator is placed on a first side of the reflecting member, a light beam generated by the beam generator irradiates onto the first side of the reflecting member along an incident light path;

at least one first lens, located on an emergent light path of the reflecting member;

the light beam emitted from the reflecting member forms a moving and layering nebula projection after passing through the at least one first lens.

The present invention further provides a nebula generation method for the lamp projecting a starry sky, comprising the following steps:

S00: the first motor driving the reflecting member, which is used to produce the nebula effect, to rotate;

S10: the light beam generated by the beam generator irradiating onto the first side of the reflecting member;

S20: the light beam emitted from the first side of the reflecting member forming the moving and layering nebula projection after passing through the at least one first lens, and projecting the moving and layering nebula projection onto a projected body.

In the lamp projecting a starry sky provided by the present invention, a starry sky projection with the effect of images is formed by combining the nebula projection, the projection of stars and the images through the cooperative arrangement of the reflecting member, the star projector and the image projector. The effect of the nebula pattern formed by the reflection of the reflecting member is softer and hazy, so the display effect of the starry sky projection with image effect is relatively soft, which meets the needs of some consumers in the market for starry sky lamps with different starry sky effects.

wherein: 2—interference filter, 3—reflecting mirror; 41—first lens, 5—fixed cylinder, 61—first motor, 7—motor control unit, 11—condenser cup, 12—first light source, 81—first light source control unit, 82—second light source control unit, 9—AC/DC conversion unit, 10—connecting shaft, 62—second motor, 201—grating sheet, 011—first grating sheet, 012—second grating sheet, 202—laser diode, 63—third motor, 40—hole-shaped light blocking sheet, 401—third grating sheet, 402—fourth grating sheet, 301—slide, 302—second lens, 303—condensing lens, 13—second light source, 403—circular hole, 14—reflecting member.

DETAILED DESCRIPTION OF THE EMBODIMENTS

Technical solutions of the present invention are further illustrated below by embodiments with reference to the drawings.

Embodiment 1

Figure 1:
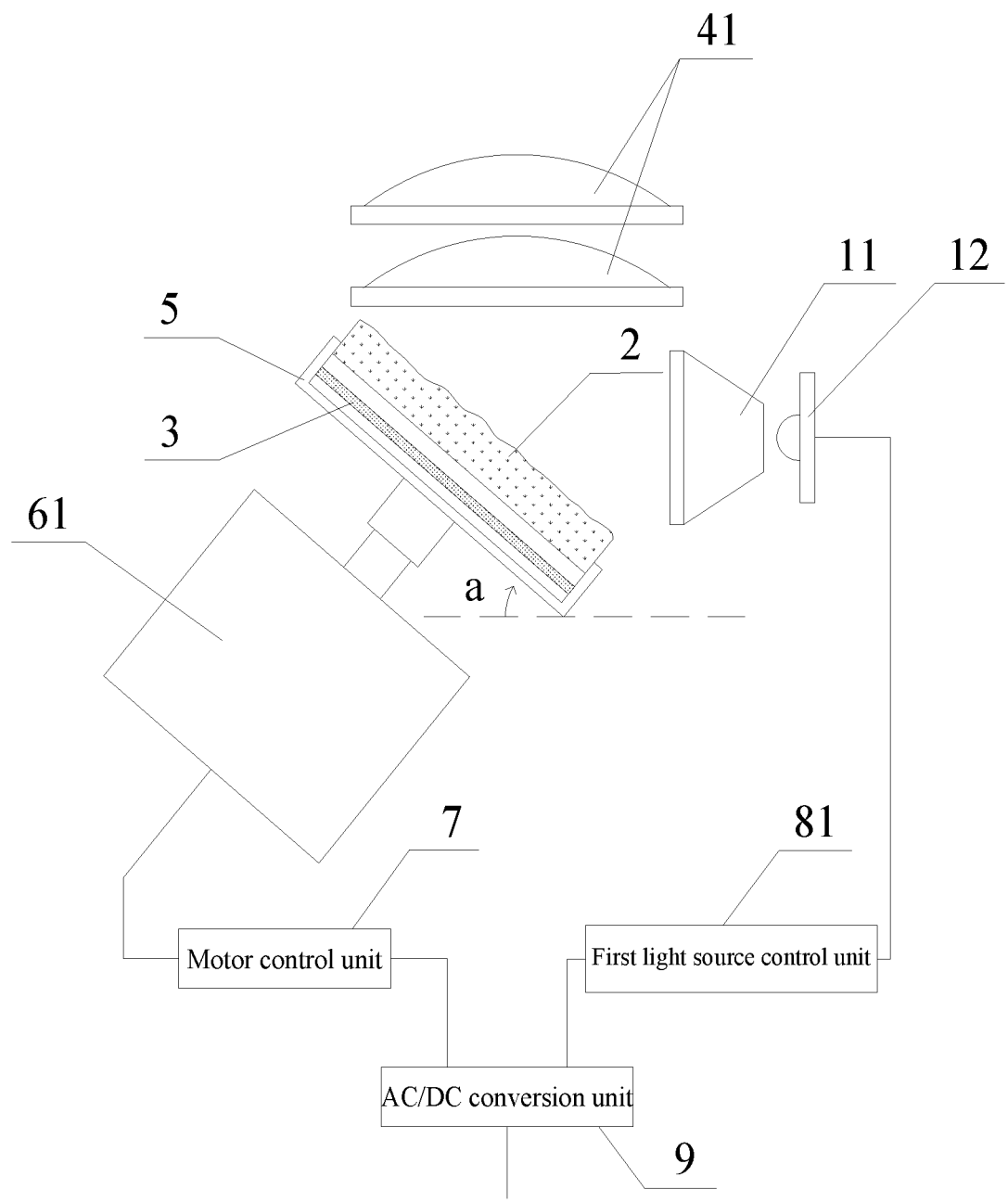
FIG. 1 is a schematic structural diagram of a lamp projecting a starry sky provided in Embodiment 1 of the present invention.

As shown in FIG. 1, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. After the interference filter 2 is irradiated by the light beam, one portion of light in the light beam is directly reflected after reaching one side of the interference filter 2; one portion of light passes through the interference filter 2 for the first time and then reaches the reflecting mirror 3, after being reflected by the reflecting mirror 3, the light beam passes through the interference filter 2 for the second time and is emitted out; another portion of light passes through the interference filter 2 for the first time and then reaches the reflecting mirror 3, after being reflected multiple times by the reflecting mirror 3 and the other side of the interference filter 2, the light beam passes through the interference filter 2 for the second time and is emitted out. The at least one first lens 41 is located on an emergent light path of the interference filter 2; the light beam emitted from one side of the interference filter 2 forms a moving and layering nebula projection after passing through the at least one first lens 41. Compared with an ordinary nebula projection, the layering nebula projection shows a sense of distance, giving the moving starry sky a sense of a vast and boundless mystery. The light beam generated by the beam generator is subjected to 1) a reflection, or 2) a refraction, a reflection and a refraction in sequence, or 3) a refraction, multiple reflections and a refraction in sequence, so that the light intensity properly decreases, so that the generated starry sky will not be too bright and dazzling in a perpendicular incidence method of the prior art, the transition of images will have a better softness. Of course, in order to avoid insufficient light intensity of the beam generator, the lamp projecting a starry sky provided in the embodiment can also use multiple beam generators or appropriately increase the light intensity of the beam generator. Preferably, the number of the at least first lens 41 is usually two, the number of the at least beam generator is usually one, a focal point of the at least one first lens 41 is located on a side of the interference filter 2, in order to properly control the distance between the at least one first lens 41 and the interference filter 2.

In order to produce a starry sky, furthermore, the lamp projecting a starry sky provided in the embodiment further comprises the fixed cylinder 5 and the first motor 61; the first motor 61 is controlled by the motor control unit 7, the motor control unit 7 controls a rotation speed and a rotation period of the first motor 61, the motor control unit 7 controls the first motor 61 to adjust the movement speed of the nebula in the nebula projection. The interference filter 2 is fixed at an opening at one end of the fixed cylinder 5, and the reflecting mirror 3 is located between the interference filter 2 and the slot bottom of the fixed cylinder 5, the power output shaft of the first motor is connected with the slot bottom; when the first motor 61 runs, the fixed cylinder 5 rotates to drive the interference filter 2 and the reflecting mirror 3 to rotate. Since the reflecting effect of the reflecting mirror 3 changes the angle of emergence of the light beam, and most of the light beam can pass through the interference filter 2 at least twice, both the beam generator and the at least one first lens 41 can be located on the same side of the interference filter 2, so that the rotation axis will not interfere with the light path of the beam generator when the first motor 61 runs. However, obviously, the projection device for producing a moving starry sky and cloud-like effect provided in the prior art can only use a small part of its grating disk as a working pattern. As can be seen, the lamp projecting a starry sky provided by the present application has a higher utilization rate of the surface area of the interference filter 2, which is conducive to reducing the size of the device.

In order to produce the light beam for projecting, furthermore, the beam generator comprises the first light source 12 and the condenser cup 11; the first light source 12 is controlled by the first light source control unit 81, the first light source control unit 81 controls the switch and light intensity of the first light source 12, the first light source control unit 81 controls the first light source 12 to adjust brightness of the nebula in the nebula projection. The first light source 12 is located on a side of the condenser cup 11, the central axis of the first light source 12 is coaxial with that of the condenser cup 11, the light generated by the first light source 12 generates the light beam after light condensing action of the condenser cup 11, the light beam irradiates onto the side of the interference filter 2 along the incident light path.

In order to make the shape of the starry sky image of the layering nebula projection more regular, furthermore, the central axis of the condenser cup 11 is perpendicular to that of the at least one first lens 41, the central axis of the reflecting mirror 3 is parallel to that of the interference filter 2, preferably, the angle between the central axis of the interference filter 2 and that of the first lens 41 is 30°-50°; more preferably, the angle between the central axis of the interference filter 2 and that of the first lens 41 is 40°. Theoretically, the oblique distribution of the interference filter 2 and the reflecting mirror 3 in 45° can make the starry sky image of the layering nebula projection more regular; however, since one or both sides of the interference filter 2 are uneven, the preferred angle is 40°. The projection of the incident light beam is located at a lower part of a side of the interference filter 2, the projection of the emergent light beam is located at an upper part of a side of the interference filter 2, and the at least one first lens 41 is located on the emergent light beam, this arrangement is conducive to increasing the utilization area, that is, reducing the volume of the device.

In order to supply power to the lamp projecting a starry sky provided in the present embodiment, the lamp projecting a starry sky provided in the present embodiment further comprises an AC/DC conversion unit 9, the AC/DC conversion unit 9 supplies power to the motor control unit 7 and the light source control unit 81 after being rectified by its rectifier circuit, so that the two can implement their control functions.

Embodiment 2

Figure 2:
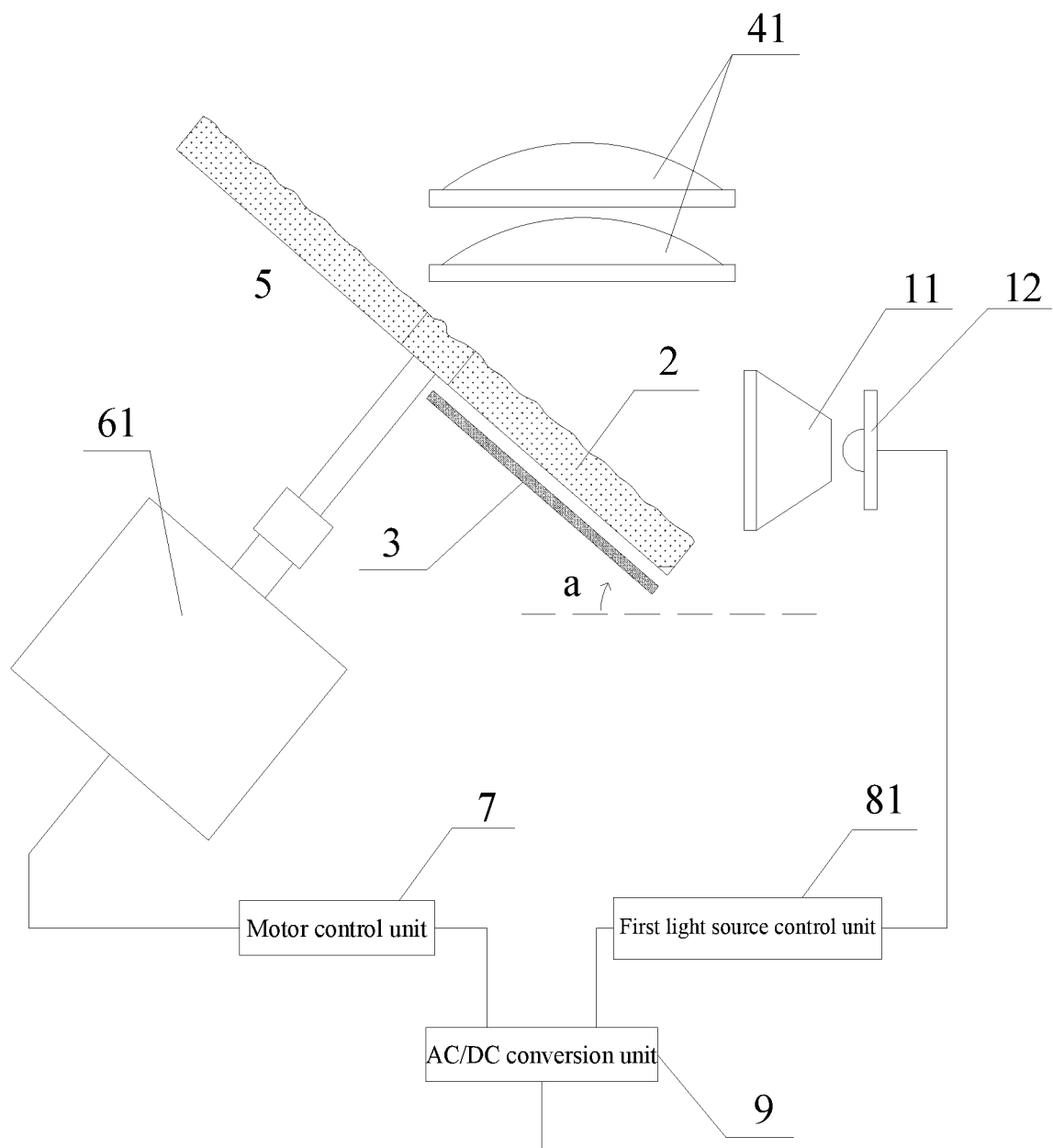
FIG. 2 is a schematic structural diagram of a lamp projecting a starry sky provided in Embodiment 2 of the present invention.

As shown in FIG. 2, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. The at least one first lens 41 is located on an emergent light path of the interference filter 2; the light beam emitted from one side of the interference filter 2 forms a moving and layering nebula projection after passing through the at least one first lens 41. The lamp projecting a starry sky provided in the present embodiment further comprises: the connecting shaft 10 connected with the first motor 61; wherein the first motor 61 is controlled by the motor control unit 7, the motor control unit 7 controls the rotation speed and the rotation period of the first motor 61, the motor control unit 7 controls the first motor 61 to adjust the movement speed of the nebula in the nebula projection. The first motor 61 is connected to the interference filter 2 through the connecting shaft 10, and the reflecting mirror 3 is located on a side of the connecting shaft 10, the central axis of the reflecting mirror 3 is parallel to the connecting shaft 10, when the first motor 61 runs, the connecting shaft 10 drives the interference filter 2 to rotate, and the reflecting mirror 3 stands still. The difference between the present embodiment and Embodiment 1 is includes: the reflecting mirror 3 stands still, and only a portion of the interference filter 2 is utilized, this arrangement method can also achieve technical effects of 1) a reflection, or 2) a refraction, a reflection and a refraction in sequence, or 3) a refraction, multiple reflections and a refraction in sequence, for passing through the interference filter 2, suitable for a lamp projecting a starry sky with a large vertical height.

Embodiment 3

Figure 3:
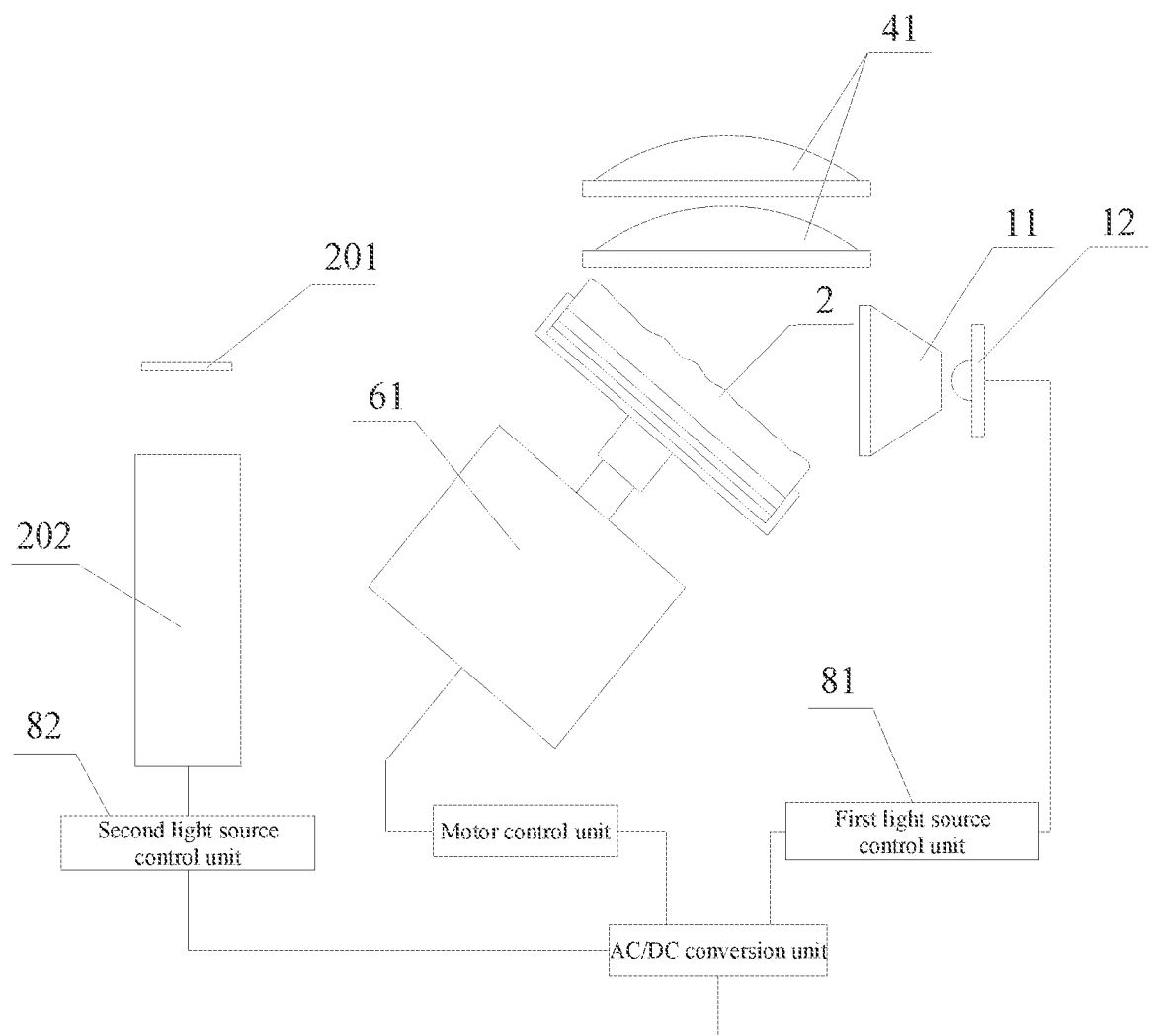
FIG. 3 is a schematic structural diagram of a lamp projecting a starry sky provided in Embodiment 3 of the present invention.

As shown in FIG. 3, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. The at least one first lens 41 is located on an emergent light path of the interference filter 2; the light beam emitted from one side of the interference filter 2 forms a moving and layering nebula projection after passing through the at least one first lens 41. The lamp projecting a starry sky provided in the present embodiment further comprises: the star projector for producing star effect; a projection of stars generated by the star projector is projected on the nebula projection to form a starry sky projection. Further preferably, the star projector comprises the grating sheet 201 and the laser diode 202; the grating sheet 201 is located on an emergent light path of the laser diode 202, the laser diode 202 is controlled by the second light source control unit 82, the second light source control unit 82 controls the laser diode 202 to adjust brightness of the stars in the projection of stars. When the light beam generated by the laser diode 202 irradiates onto the grating sheet 201, a static projection of stars is generated then.

Embodiment 4

Figure 4:
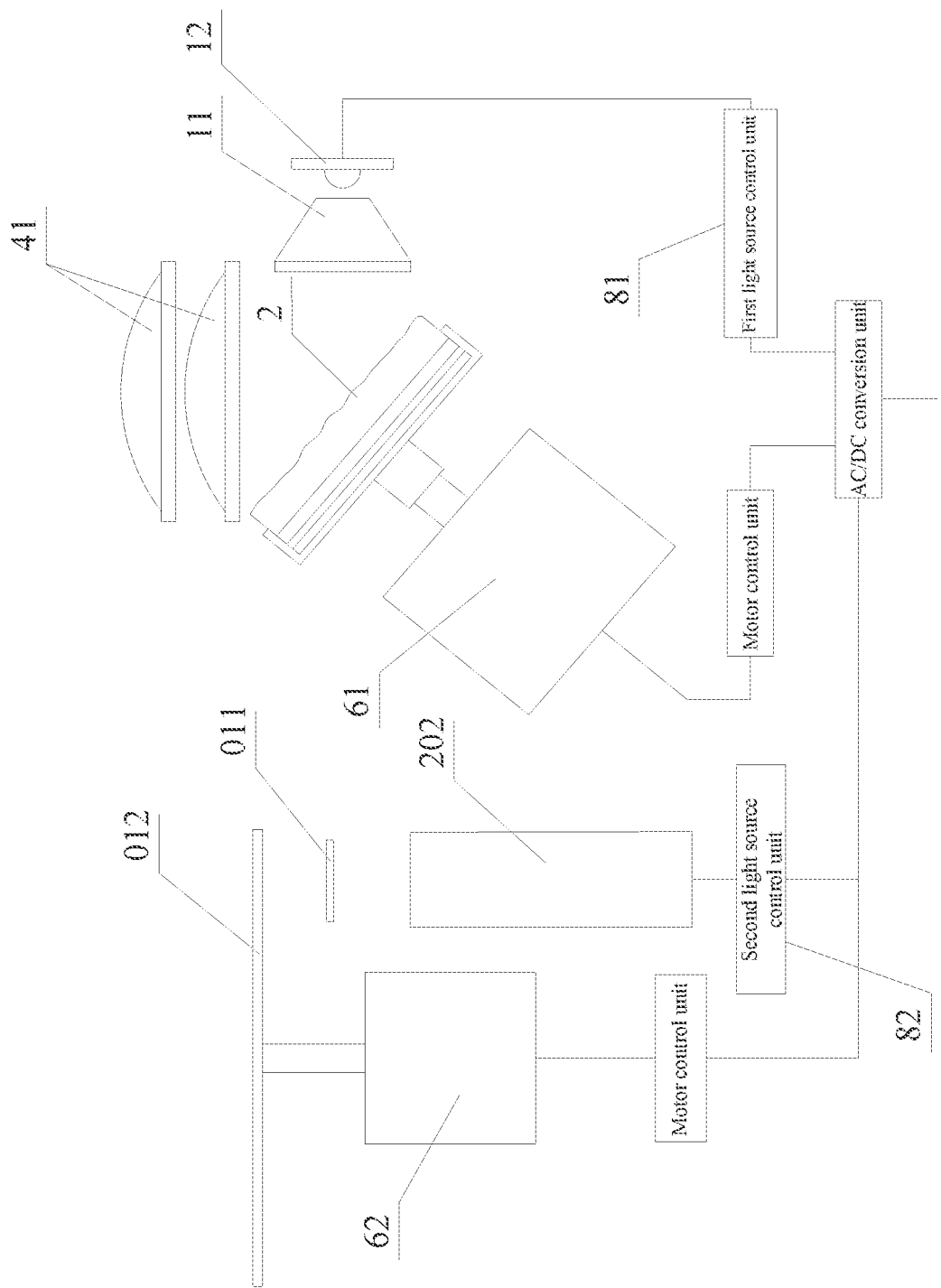
FIG. 4 is a schematic structural diagram of a lamp projecting a starry sky provided in Embodiment 4 of the present invention.

As shown in FIG. 4, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. The at least one first lens 41 is located on an emergent light path of the interference filter 2; the light beam emitted from one side of the interference filter 2 forms a moving and layering nebula projection after passing through the at least one first lens 41. The lamp projecting a starry sky provided in the present embodiment further comprises: the star projector for producing star effect; a projection of stars generated by the star projector is projected on the nebula projection to form a starry sky projection. Furthermore, the star projector comprises the second motor 62, the first grating sheet 011, the second grating sheet 012 and the laser diode 202. The power output end of the second motor 62 is connected with the second grating sheet 012, so as to drive the second grating sheet 012 to rotate; the light beam emitted by the laser diode 202 sequentially passes through the first grating sheet 011 and a portion of the second grating sheet 012 which is rotating, so as to produce the projection of stars which are moving. The second motor 62 is controlled by the motor control unit 7, the motor control unit 7 controls the rotation speed and the rotation period of the second motor 62; the motor control unit 7 controls the second motor 62 to adjust the movement speed of stars in the projection of stars. The laser diode 202 is controlled by the second light source control unit 82, the second light source control unit 82 controls the laser diode 202 to adjust brightness of the stars in the projection of stars. The light beam generated by the laser diode 202 irradiates onto the first grating sheet 011, so as to form a plurality of relatively large light beams of the projection of stars, the light beams of the projection of stars irradiates onto a portion of the second grating sheet 012 directly facing to the first grating sheet 011; the second motor 62 drives the second grating sheet 012 to rotate to form a dynamic projection of stars.

Embodiment 5

Figure 5:
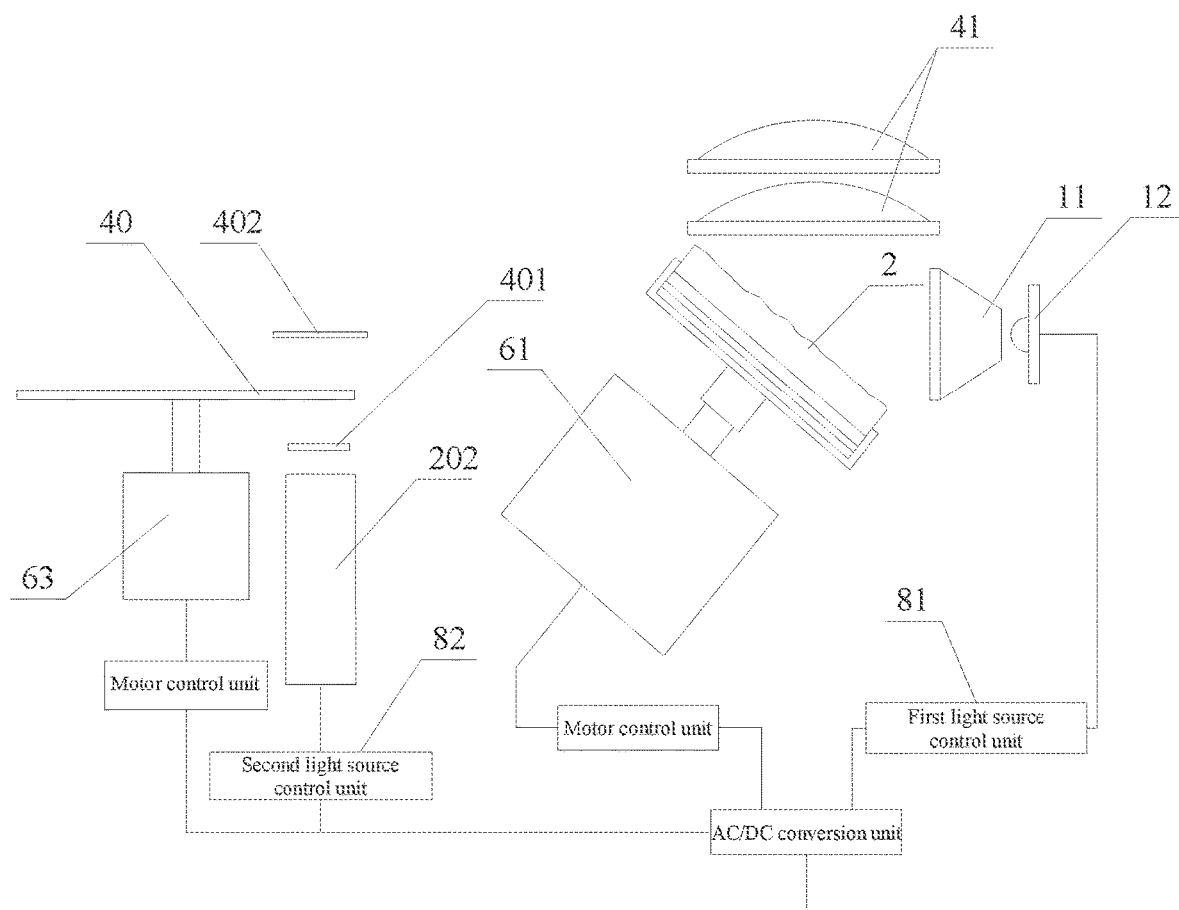
FIG. 5 is a schematic structural diagram of a lamp projecting a starry sky provided in Embodiment 5 of the present invention.

As shown in FIG. 5, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. The at least one first lens 41 is located on an emergent light path of the interference filter 2; the light beam emitted from one side of the interference filter 2 forms a moving and layering nebula projection after passing through the at least one first lens 41. The lamp projecting a starry sky provided in the present embodiment further comprises: the third motor 63, the hole-shaped light blocking sheet 40, the third grating sheet 401, the fourth grating sheet 402 and the laser diode 202; the power output end of the third motor 63 is connected with the hole-shaped light blocking sheet 40, so as to drive the hole-shaped light blocking sheet 40 to rotate; a plurality of circular holes 403 are arranged on the hole-shaped light blocking sheet 40. The light beam emitted by the laser diode 202 sequentially passes through the third grating sheet 401, the hole-shaped light blocking sheet which is rotating 40, and the fourth grating sheet 402; wherein a plurality of light beams are formed after passing through the third grating sheet 401, the plurality of circular holes 403 arranged on the hole-shaped light blocking sheet 40 make a portion of the circular hole 403 be blocked, in this case, the fourth grating sheet 402 can only split the light beams that are not blocked, so as to form the projection of stars, due to the blocking, the projection of stars which is twinkling is generated on the fourth grating sheet 402. Furthermore, the lamp projecting a starry sky further comprises the motor control unit 7 for controlling the rotation speed and the rotation period of the third motor 63; the motor control unit 7 controls the third motor 63 to adjust the twinkling frequency of stars in the projection of stars. More preferably, the lamp projecting a starry sky further comprises the fourth motor; the fourth motor drives the third grating sheet 401 and/or the fourth grating sheet 402 to rotate; the light beam emitted by the laser diode 202 sequentially passes through the third grating sheet 401 which is rotating, the hole-shaped light blocking sheet 40 which is rotating, and the fourth grating sheet 402, so as to produce the projection of stars which are twinkling and rotating; or the light beam emitted by the laser diode 202 sequentially passes through the third grating sheet 401, the hole-shaped light blocking sheet 40 which is rotating, and the fourth grating sheet 402 which is rotating, so as to produce the projection of stars which are twinkling and moving. Since the lamp projecting a starry sky provided in the present embodiment has both the hole-shaped light blocking sheet 40 and the grating sheet which is rotating, some stars in the projection of stars which are moving are blocked, finally forming the projection of stars which are twinkling and moving.

Embodiment 6

Figure 6:
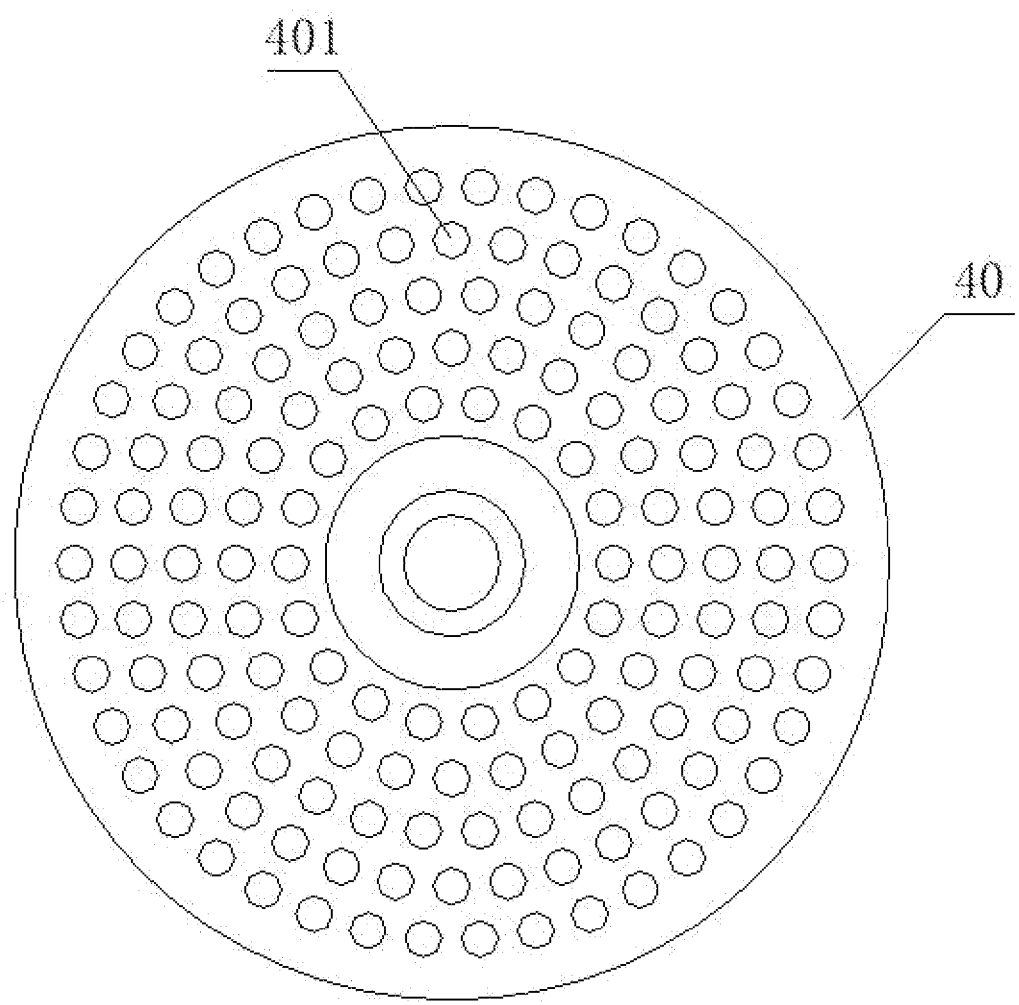
FIG. 6 is a top view of a hole-shaped light blocking sheet provided in Embodiment 5 of the present invention.
Figure 7:
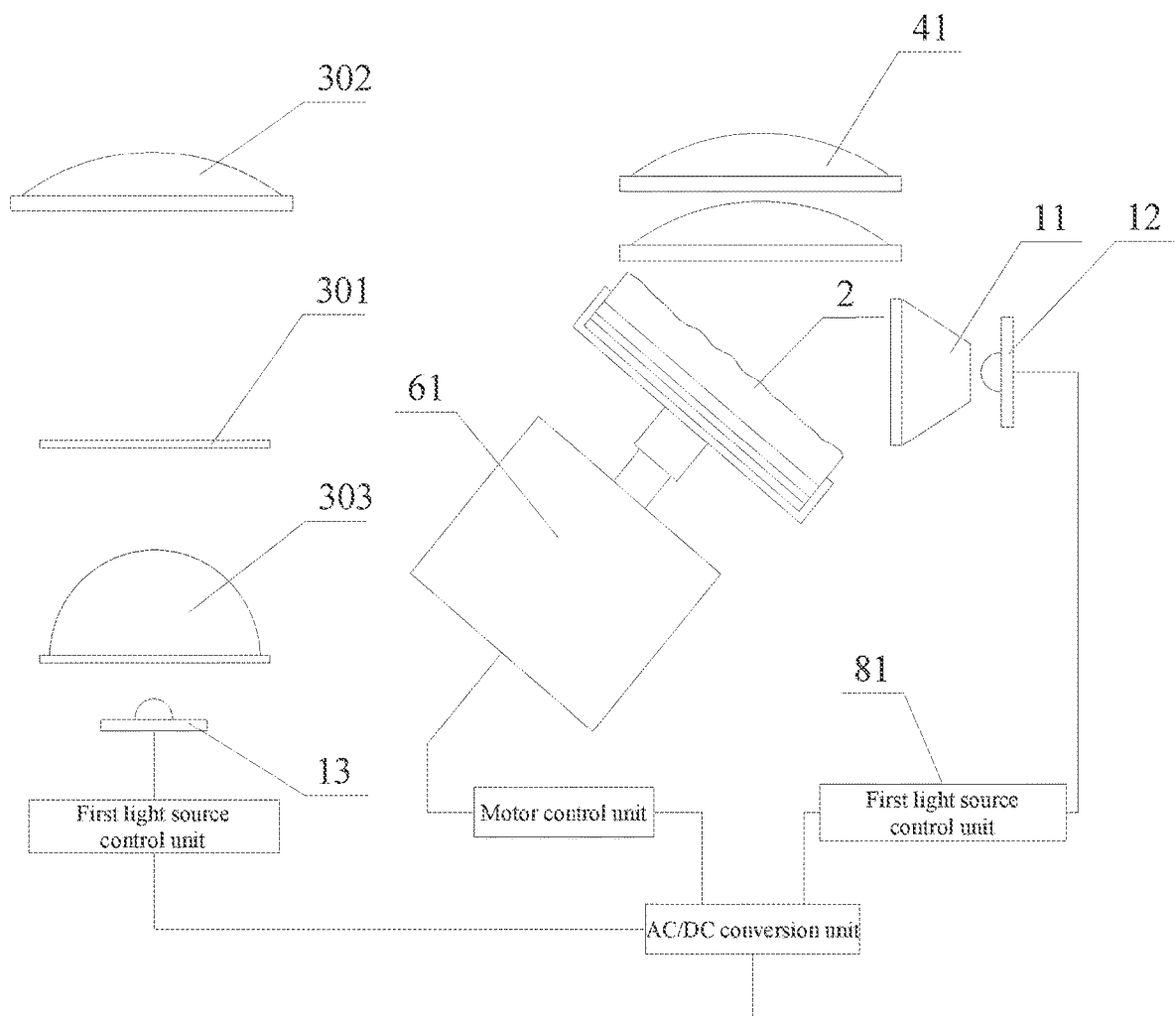
FIG. 7 is a schematic structural diagram of a lamp projecting a starry sky provided in Embodiment 6 of the present invention.
Figure 8:
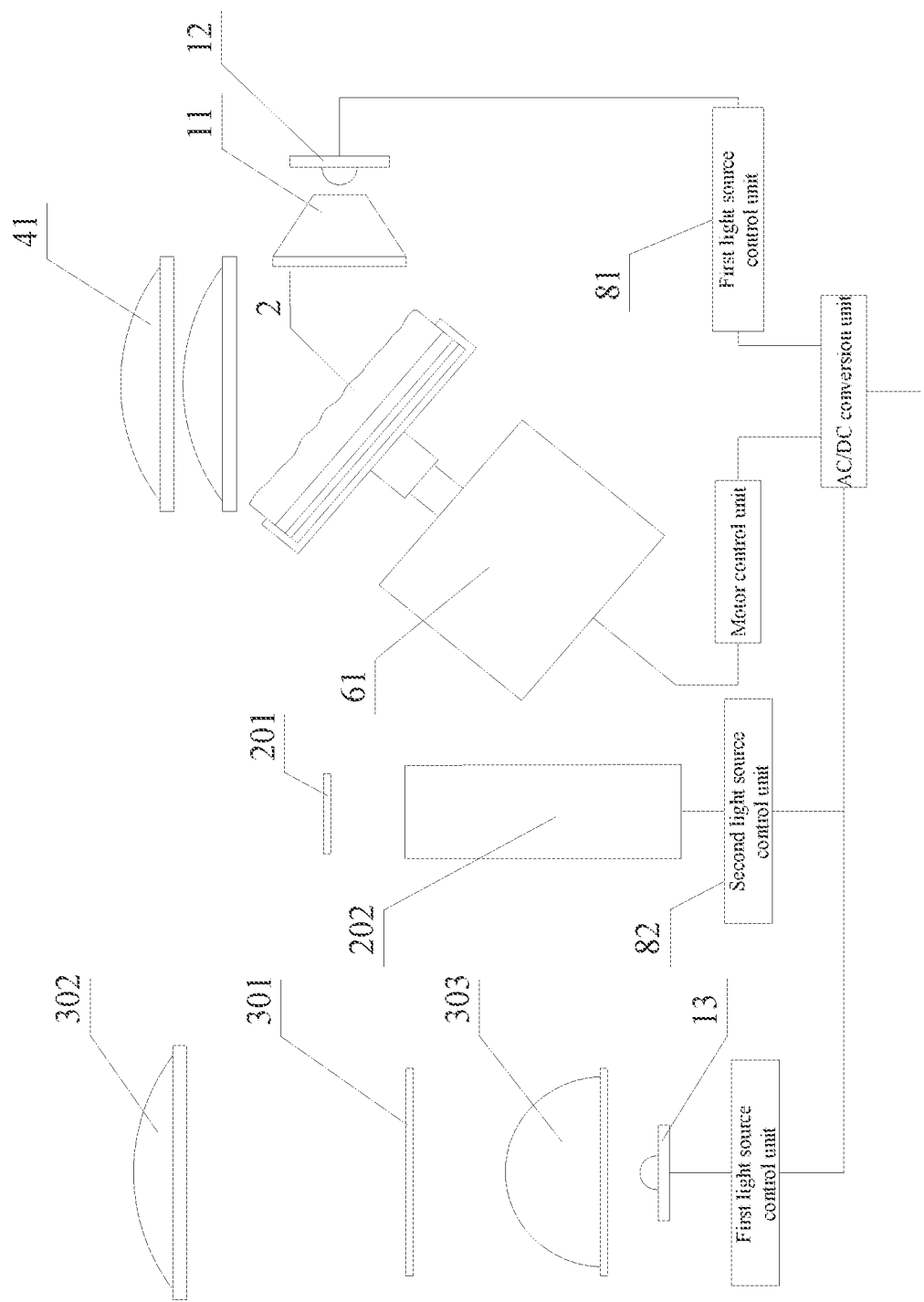
FIG. 8 is a schematic structural diagram of a lamp projecting a starry sky provided in Embodiment 7 of the present invention.
Figure 9:
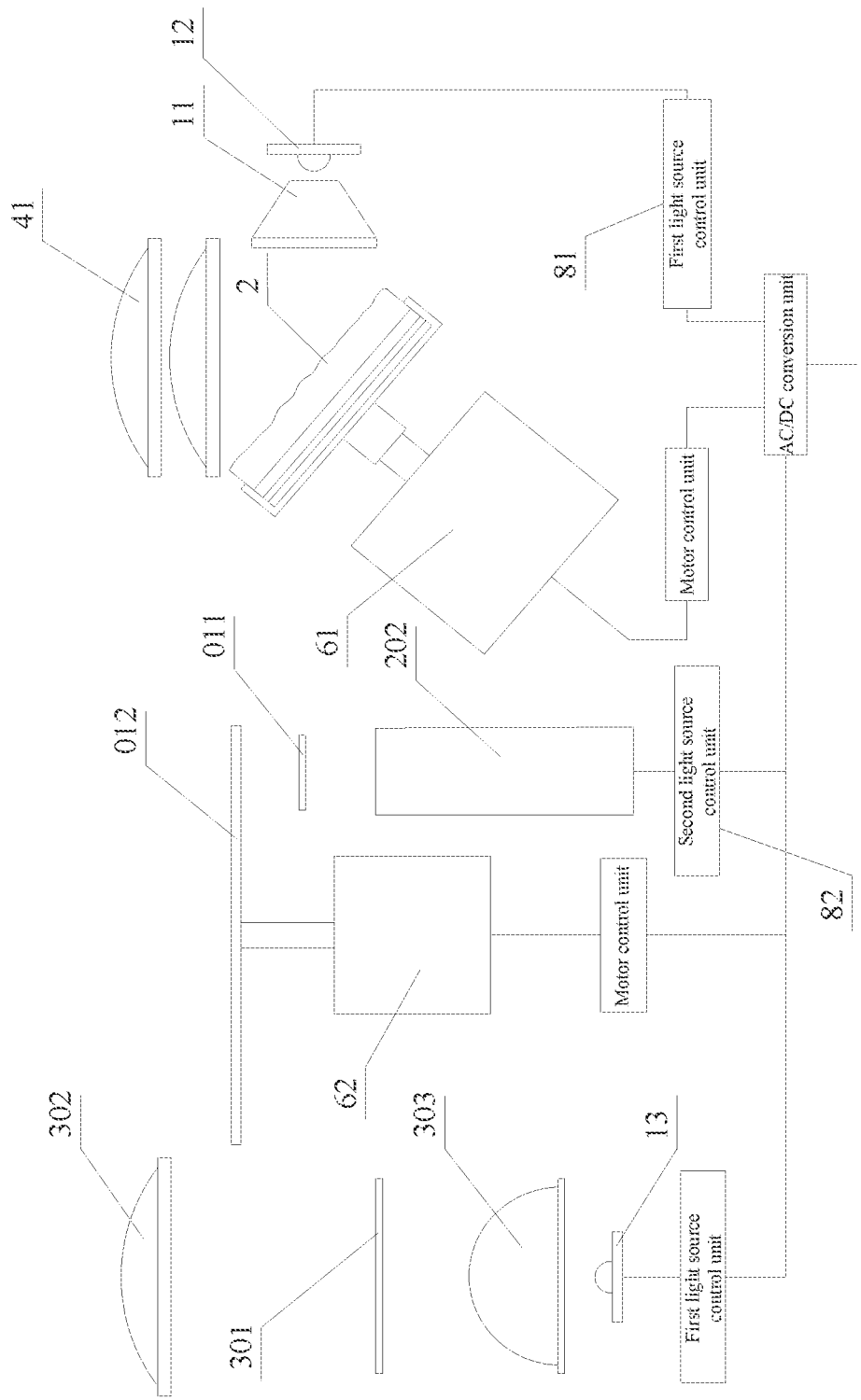
FIG. 9 is a schematic structural diagram of a lamp projecting a starry sky provided in Embodiment 8 of the present invention.
Figure 10:
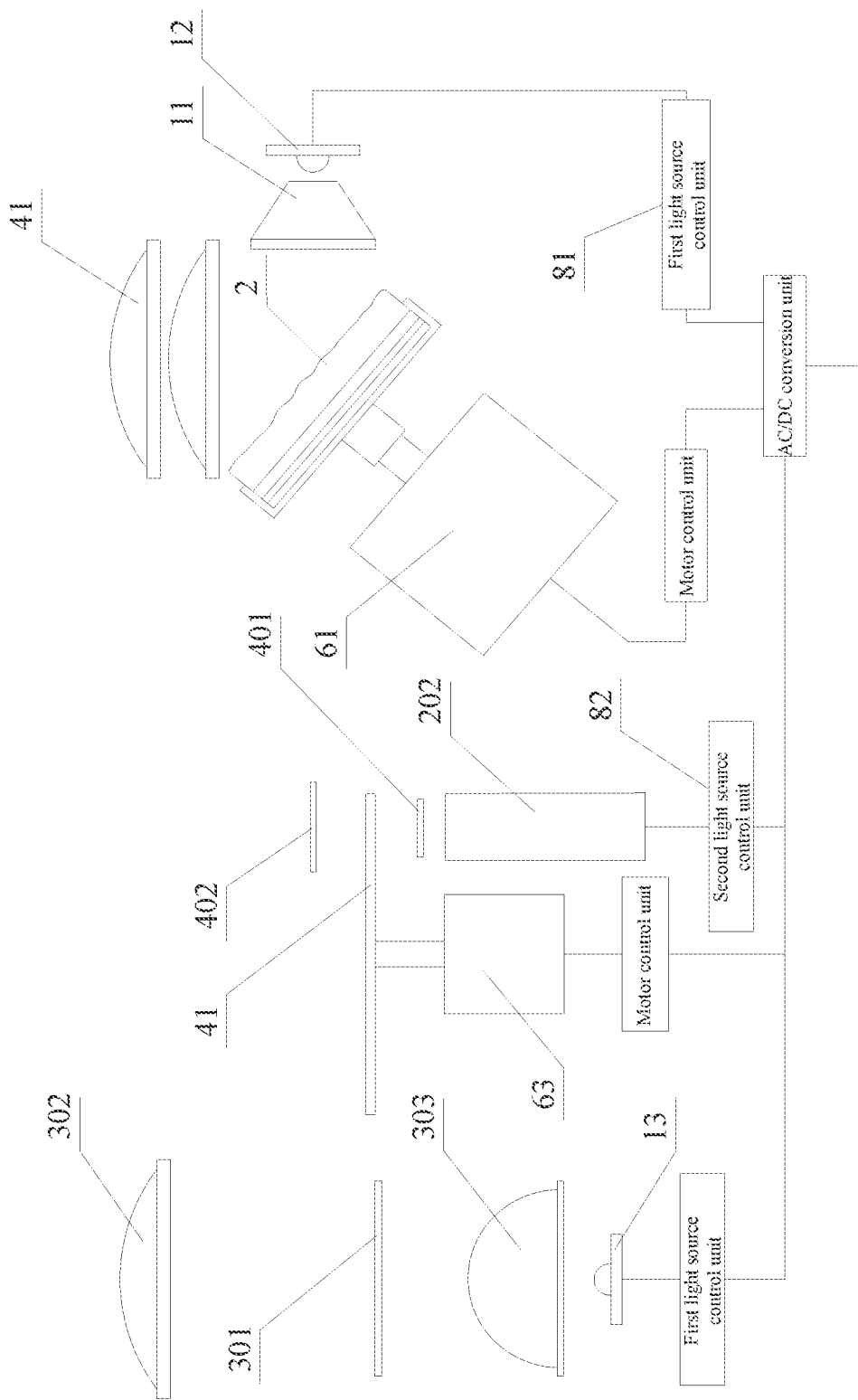
FIG. 10 is a schematic structural diagram of a lamp projecting a starry sky provided in Embodiment 9 of the present invention.

As shown in FIG. 6, the lamp projecting a starry sky provided in the embodiment comprises: at least one beam generator; the interference filter 2 configured to produce nebula effect, the reflecting mirror 3, and at least one first lens 41; wherein the beam generator is placed on a side of the interference filter 2, a light beam generated by the beam generator irradiates onto the side of the interference filter 2 along an incident light path; the reflecting mirror 3 is placed on the other side of the interference filter 2. The at least one first lens 41 is located on an emergent light path of the interference filter 2; the light beam emitted from one side of the interference filter 2 forms a moving and layering nebula projection after passing through the at least one first lens 41. The lamp projecting a starry sky provided in the present embodiment further comprises: the image projector for producing images; images generated by the star projector are projected on a nebula projection or a starry sky projection, so as to form the nebula projection or the starry sky projection with images. Furthermore, the image projector comprises the slide 301 for generating images, the at least one second lens 302, the condensing lens 303 and the second light source 13. The light generated by the second light source 13 generates the light beam after light condensing action of the condensing lens 303, the light beam irradiates onto the slide 301 and is enlarged by the at least one second lens 302 to form images. The second light source 13 is controlled by the light source control unit 8, the light source control unit 8 controls the switch and light intensity of the second light source 13, the focal point of the at least one second lens 302 is preferably located on a side of the slide 301, in order to properly control the distance between the at least one second lens 302 and the slide 301. The light generated by the second light source 13 generates the light beam after light condensing action of the condensing lens 303, the light beam irradiates onto the slide 301 to form image projections. Images on the slide 301 can be customized by users, such as: a moon image, an image of Chang'e flying to the moon, the Milky Way, etc.

Embodiments 7-9

Embodiment 7 can be formed by combining Embodiment 1, Embodiment 3 and Embodiment 6, and Embodiment 7 can project the layering nebula projection, the static projection of stars, and static images; Embodiment 8 can be formed by combining Embodiment 1, Embodiment 4 and Embodiment 6, and Embodiment 8 can project the layering nebula projection, the dynamic projection of stars, and static images; Embodiment 9 can be formed by combining Embodiment 1, Embodiment 5 and Embodiment 6, and Embodiment 9 can project the layering nebula projection, the projection of stars which are twinkling, and static images; these three situations are common combination scenarios of the foregoing embodiments, and in fact, a personalized combination can be customized according to customer needs.

Embodiment 10

A nebula generation method for the lamp projecting a starry sky provided in Embodiment 10 is implemented according to the following steps:

Step S00: the first motor driving the interference filter 3 and the reflecting mirror 3, which are used to produce nebula effect, to rotate;

Step S10: a light beam generated by the beam generator irradiating onto the side of the interference filter 2 which is rotating; after the side of the interference filter 2 is irradiated by the light beam, light in the light beam passes through and emits from the side of the interference filter 2 after being subjected to 1) a reflection, or 2) a refraction, a reflection from the reflecting mirror 3 and a refraction in sequence, or 3) a refraction, multiple reflections from the reflecting mirror 3 and the other side of the interference filter 2 and a refraction in sequence under action of the interference filter 2 and the reflecting mirror 3. Most of the light is directly reflected by one side of the interference filter 2, or passes through the interference filter 2 twice under one reflection from reflecting mirror 3, or after multiple reflections between the reflecting mirror 3 and the interference filter 2, irradiates onto the first lens 41, as a result, compared with an ordinary nebula projection, the produced layering nebula projection shows a sense of distance, so that the generated starry sky will not be too bright and dazzling, and the transition of images will have a better softness, which effectively enhances the layering sense of the starry sky.

Step S20: the light beam emitted from the one side of the interference filter 2 forming a moving and layering nebula projection after passing through the at least one first lens 41, and projecting the nebula projection onto a projected body, forming the layering nebula projection showing a three-dimensional sense. In this case, the projected body is configured to be an object that can be clearly projected, such as a wall or a curtain.

Embodiment 11

Figure 11:
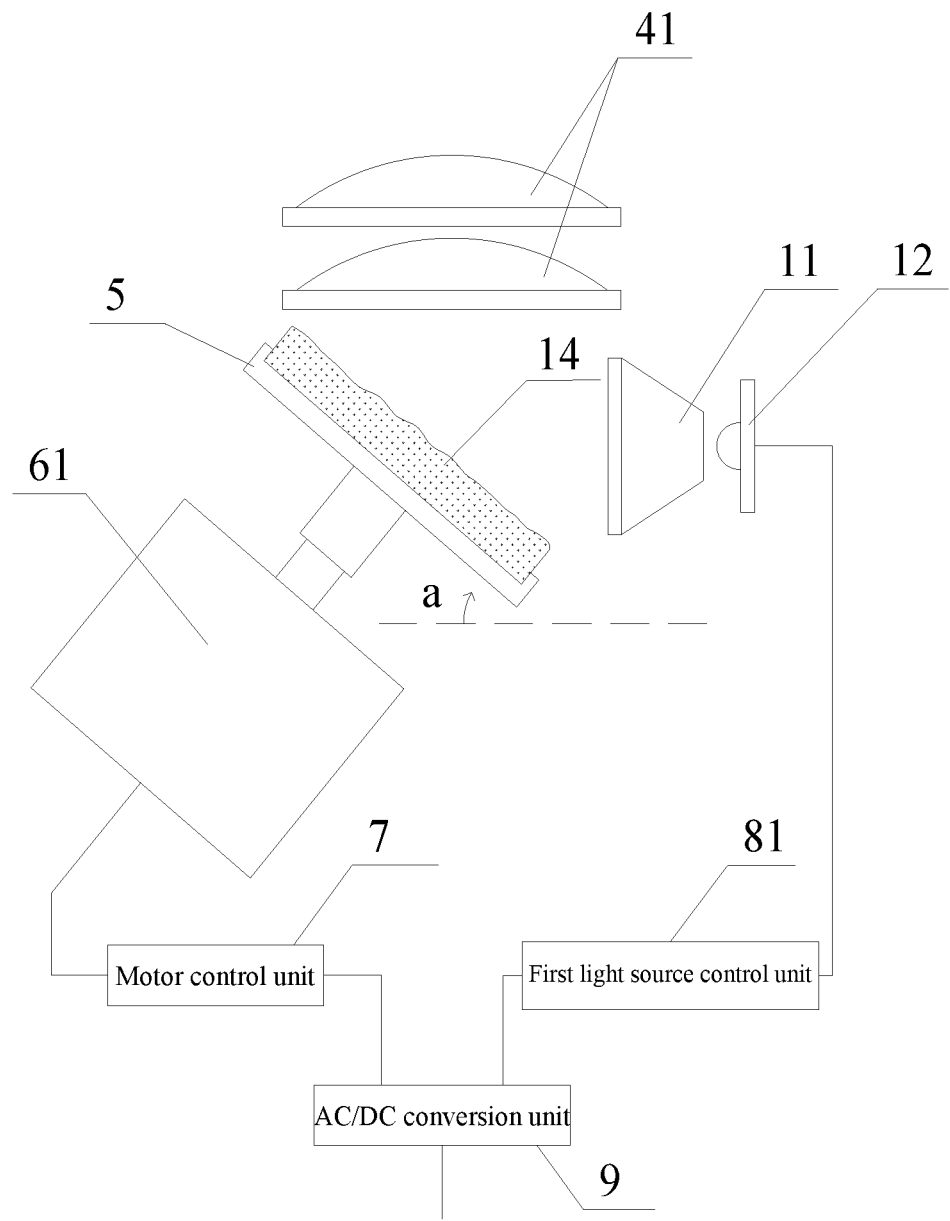
FIG. 11 is a schematic structural diagram of a lamp projecting a starry sky provided in Embodiment 11 of the present invention.

As shown in FIG. 11, the lamp projecting a starry sky provided in the embodiment comprises: at least one beam generator; the reflecting member 14, a first motor 61, and at least one first lens 41; wherein a reflecting surface of the reflecting member 14 is uneven and irregular, the beam generator is placed on a first side of the reflecting member 14, a light beam generated by the beam generator irradiates onto the first side of the reflecting member 14 along an incident light path. The at least one first lens 41 is located on an emergent light path of the reflecting member 14; the light beam emitted from the reflecting member 14 forms a layering nebula projection after passing through the at least one first lens 41, the first motor 61 is connected to the reflecting member 14 through a connecting shaft, the reflecting member 14 is driven to rotate when the first motor 61 rotates, so a moving and layering nebula projection is formed. The reflecting surface of the reflecting member 14 can be located on the first side of the reflecting member 14, it can also be located on the other side of the reflecting member 14, or may be located on both sides of the reflecting member 14 at the same time.

When the reflecting surface of the reflective member 14 is located on the first side of the reflecting member 14, the light beam is irradiated on the reflecting surface on the first side of the reflecting member 14, and a path of one portion of the light beam is greatly deviated, and the light beam is deviated and cannot be reflected to the at least one first lens 41, the other portion of the light beam is reflected by the uneven and irregular reflecting surface, and finally can be reflected on the at least one first lens 41, and finally a nebula projection is formed. Because the light beam generated by the beam generator is directly reflected on the reflecting surface of the reflecting member 14, the light beam is scattered only once, and only one beam scattering can project a sense of smoke, and the effect is biased towards the hazy effect;

When the reflecting surface of the reflective member 14 is located on the other side of the reflecting member 14, after the reflecting member 14 is irradiated by the light beam, one portion of light in the light beam is directly reflected after reaching the first side of the reflecting member 14; one portion of light passes through the reflecting member 14 for the first time and then reaches the reflecting surface, after being reflected by the reflecting surface, the light beam passes through the reflecting member 14 for the second time and is emitted out; another portion of light passes through the reflecting member 14 for the first time and then reaches the reflecting surface, after being reflected multiple times by the reflecting surface, the light beam passes through the reflecting member 14 for the second time and is emitted out. The light beam emitted from the first side of the reflecting member 14 forms a layering nebula projection after passing through the at least one first lens 41. Compared with an ordinary nebula projection, the layering nebula projection shows a sense of distance, giving the moving starry sky a sense of a vast and boundless mystery. The light beam generated by the beam generator is subjected to 1) a reflection, or 2) a refraction, a reflection and a refraction in sequence, or 3) a refraction, multiple reflections and a refraction in sequence, so that the light intensity properly decreases, so that the generated starry sky will not be too bright and dazzling in a perpendicular incidence method of the prior art, the transition of images will have a better softness.

Due to manufacturing process problems, sometimes the light beam cannot be completely reflected, and a part of the light still passes through the reflecting surface. Therefore, reflecting surfaces can be provided on both sides of the reflecting member 14 to form a more hazy and soft layering nebula projection.

Of course, in order to avoid insufficient light intensity of the beam generator, the lamp projecting a starry sky provided in the embodiment can also use multiple beam generators or appropriately increase the light intensity of the beam generator. The function of the at least one first lens 41 is to enlarge the projection area of the light beam, if a larger projection area is required, the number of lenses can be increased, for example, to two. The number of the at least beam generator is usually one, a focal point of the at least one first lens 41 is located on a side of the reflecting member 14, in order to properly control the distance between the at least one first lens 41 and the reflecting member 14.

In order to produce a moving layering nebula projection, furthermore, the lamp projecting a starry sky provided in the embodiment further comprises the fixed cylinder 5, the reflecting member 14 is fixed at an opening at one end of the fixed cylinder 5, the connecting shaft connected to the first motor 61 is connected with a slot bottom of the fixed cylinder; when the first motor 61 runs, the fixed cylinder 5 rotates to drive the reflecting member 14 to rotate. The first motor 61 is controlled by the motor control unit 7, the motor control unit 7 controls a rotation speed and a rotation period of the first motor 61, the motor control unit 7 controls the first motor 61 to adjust the movement speed of the nebula in the nebula projection.

In order to produce the light beam for projecting, furthermore, the beam generator comprises the first light source 12 and the condenser cup 11; the first light source 12 is controlled by the first light source control unit 81, the first light source control unit 81 controls the switch and light intensity of the first light source 12, the first light source control unit 81 controls the first light source 12 to adjust brightness of the nebula in the nebula projection. The first light source 12 is located on a side of the condenser cup 11, the central axis of the first light source 12 is coaxial with that of the condenser cup 11, the light generated by the first light source 12 generates the light beam after light condensing action of the condenser cup 11, the light beam irradiates onto the first side of the reflecting member 14 along the incident light path.

In order to make the shape of the starry sky image of the layering nebula projection more regular, furthermore, the central axis of the condenser cup 11 is perpendicular to that of the at least one first lens 41, preferably, the angle between the central axis of the reflecting member 14 and that of the first lens 41 is 30°-50°; more preferably, the angle between the central axis of the reflecting member 14 and that of the first lens 41 is 40°. Theoretically, the oblique distribution of the reflecting member 14 in 45° can make the starry sky image of the layering nebula projection more regular; however, since one or both sides of the reflecting member 14 are uneven, the preferred angle is 40°. The projection of the incident light beam is located at a lower part of a first side of the reflecting member 14, the projection of the emergent light beam is located at an upper part of the first side of the reflecting member 14, and the at least one first lens 41 is located on the emergent light beam, this arrangement is conducive to increasing the utilization area, that is, reducing the volume of the device.

In order to supply power to the lamp projecting a starry sky provided in the present embodiment, the lamp projecting a starry sky provided in the present embodiment further comprises an AC/DC conversion unit 9, the AC/DC conversion unit 9 supplies power to the motor control unit 7 and the light source control unit 81 after being rectified by its rectifier circuit, so that the two can implement their control functions.

The reflecting member 14 in the embodiment may include a reflecting disk with uneven and irregular surface and a mirror-coated film provided on the uneven and irregular surface, specifically, through the cooperation of the reflecting disk and the mirror-coated film, the reflecting member 14 has a function of reflective, and pre-design a reflecting disk with an uneven and irregular surface, and then cover the uneven and irregular surface with a mirror-coated film, so that the design also facilitates the manufacture and production of the reflecting member 14; Or the reflecting member 14 is a reflecting mirror with uneven and irregular surface, specifically, compared with the above-mentioned reflecting disk and mirror-coating film, the reflecting mirror with uneven and irregular surface is simpler in structure and convenient for direct use; the further embodiment of the reflecting member 14 includes a reflecting disk with uneven and irregular surface, a mirror-coated film provided on the uneven and irregular surface, and a mirror-coated film or a reflecting mirror provided on the other surface.

Embodiment 12

Figure 12:
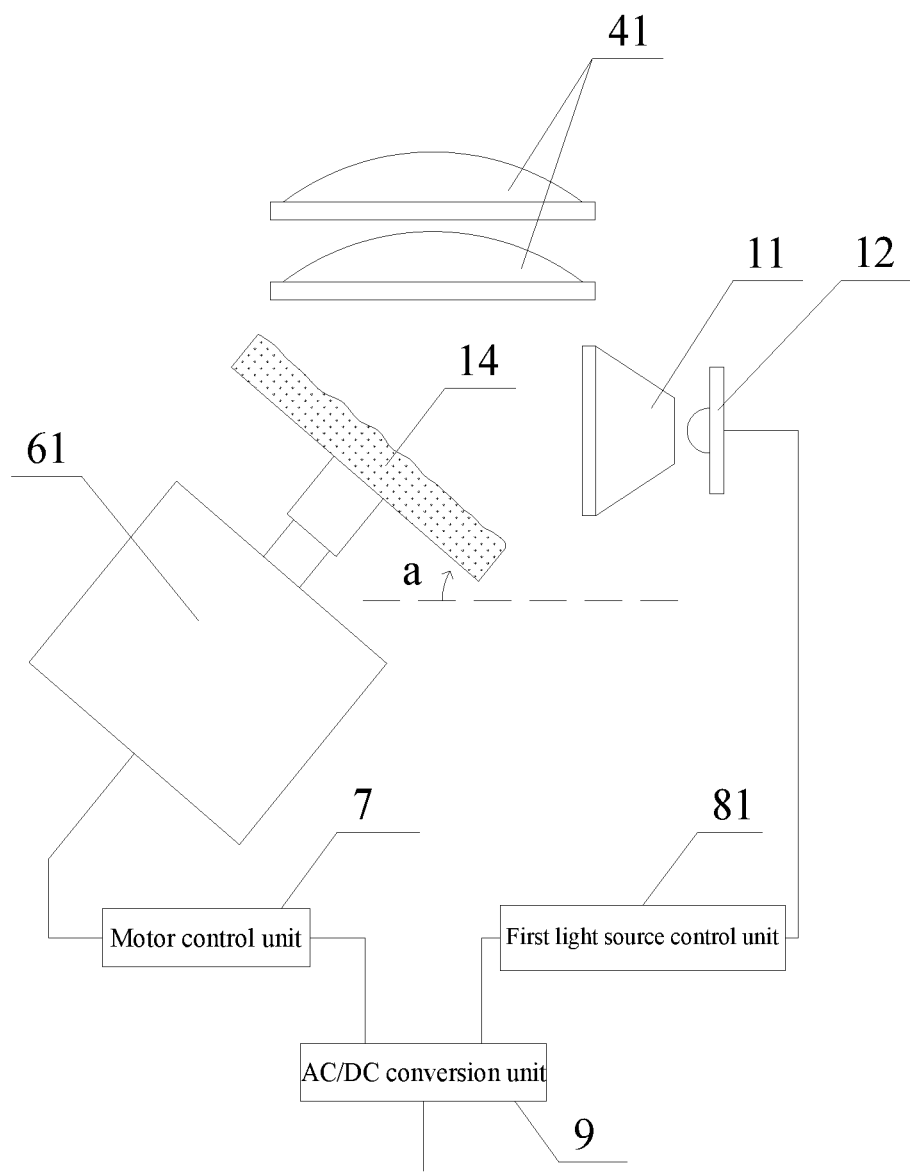
FIG. 12 is a schematic structural diagram of a lamp projecting a starry sky provided in Embodiment 12 of the present invention.

As shown in FIG. 12, the difference between this embodiment and the Embodiment 11 is that the first motor 61 in this embodiment is directly connected to the side of the reflecting member 14 through a connecting shaft, and when the first motor 61 rotates, the reflecting member 14 is driven to rotate to form a moving and layering nebula projection. Compared with installing the reflecting member 14 through a fixed cylinder, the present embodiment is more simplified in structure, which further reduces the production and manufacturing costs.

Embodiment 13

Figure 13:
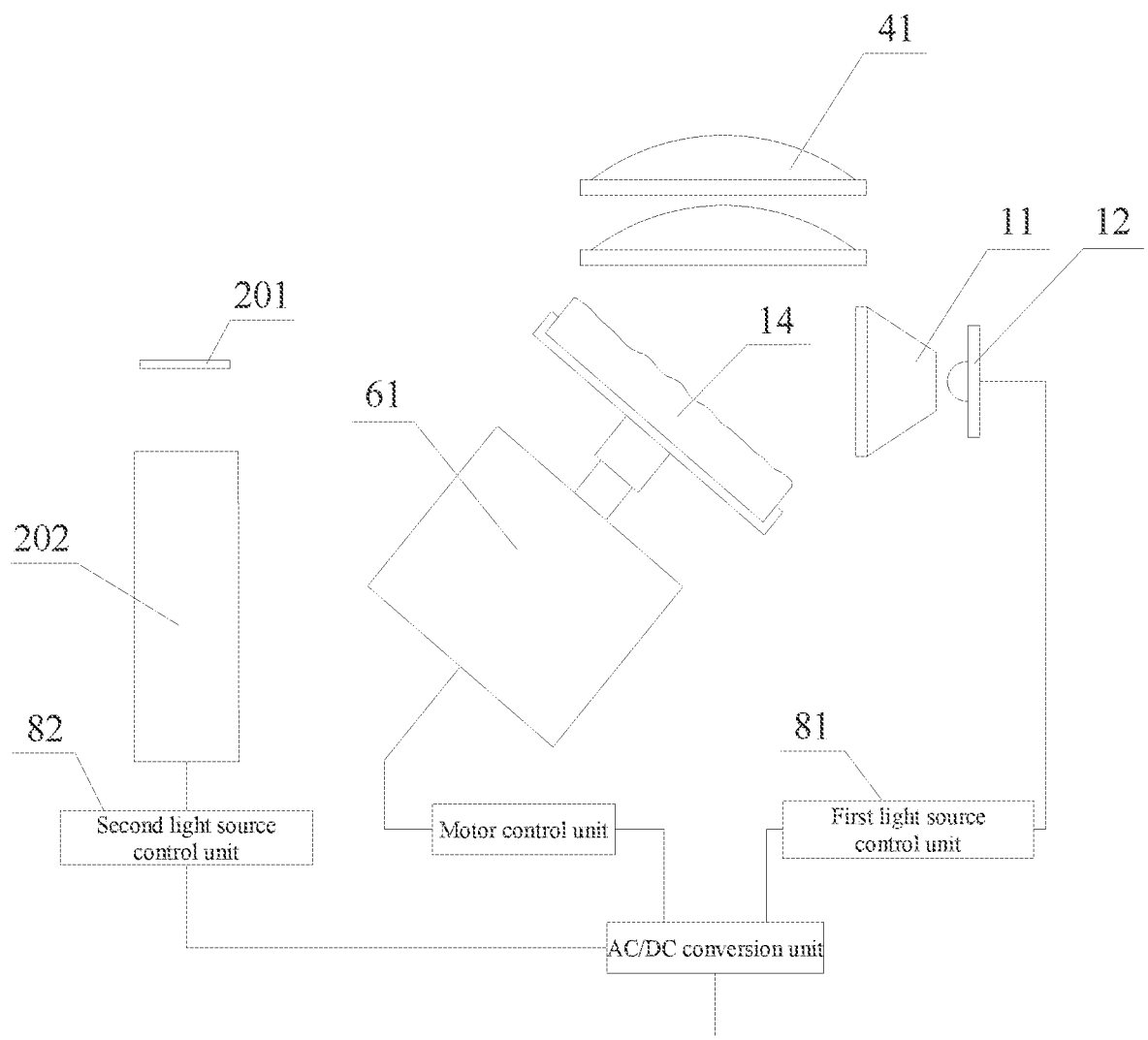
FIG. 13 is a schematic structural diagram of a lamp projecting a starry sky provided in Embodiment 13 of the present invention.

As shown in FIG. 13, the lamp projecting a starry sky provided in the embodiment comprises: at least one beam generator; a reflecting member 14, a reflecting surface of the reflecting member 14 is uneven and irregular; a first motor 61 connected to the reflecting member 14 through a connecting shaft, the reflecting member 14 is driven to rotate when the first motor 61 rotates; the beam generator is placed on a first side of the reflecting member 14, a light beam generated by the beam generator irradiates onto the first side of the reflecting member 14 along an incident light path; at least one first lens 41, located on an emergent light path of the reflecting member 14; the light beam emitted from the reflecting member 14 forms a moving and layering nebula projection after passing through the at least one first lens 41. The lamp projecting a starry sky provided in the present embodiment further comprises: the star projector for producing star effect; a projection of stars generated by the star projector is projected on the nebula projection to form a starry sky projection. Further preferably, the star projector comprises the grating sheet 201 and the laser diode 202; the grating sheet 201 is located on an emergent light path of the laser diode 202, the laser diode 202 is controlled by the second light source control unit 82, the second light source control unit 82 controls the laser diode 202 to adjust brightness of the stars in the projection of stars. When the light beam generated by the laser diode 202 irradiates onto the grating sheet 201, a static projection of stars is generated then.

Embodiment 14

Figure 14:
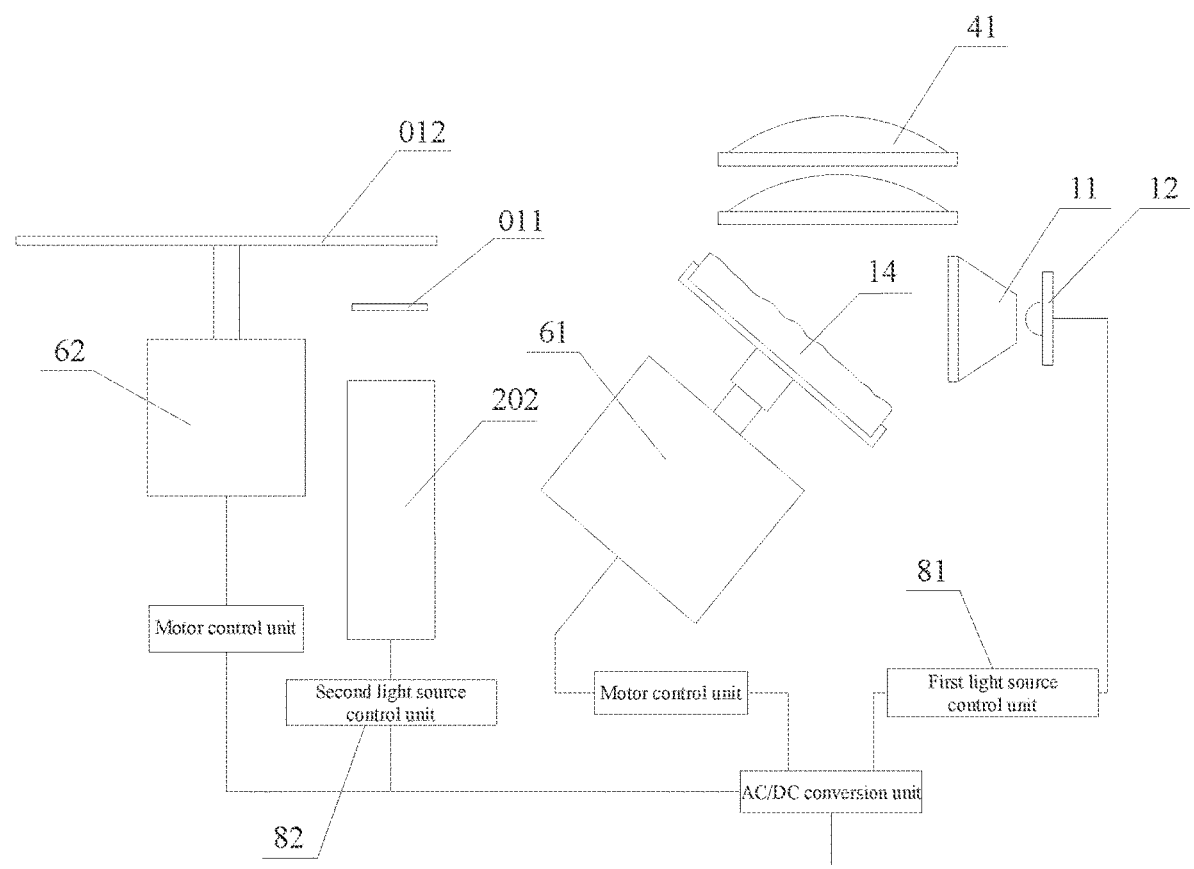
FIG. 14 is a schematic structural diagram of a lamp projecting a starry sky provided in Embodiment 14 of the present invention.

As shown in FIG. 14, the lamp projecting a starry sky provided in the embodiment comprises: at least one beam generator; a reflecting member 14, a reflecting surface of the reflecting member 14 is uneven and irregular; a first motor 61 connected to the reflecting member 14 through a connecting shaft, the reflecting member 14 is driven to rotate when the first motor 61 rotates; the beam generator is placed on a first side of the reflecting member 14, a light beam generated by the beam generator irradiates onto the first side of the reflecting member 14 along an incident light path; at least one first lens 41, located on an emergent light path of the reflecting member 14; the light beam emitted from the reflecting member 14 forms a moving and layering nebula projection after passing through the at least one first lens 41. The lamp projecting a starry sky provided in the present embodiment further comprises: the star projector for producing star effect; a projection of stars generated by the star projector is projected on the nebula projection to form a starry sky projection. Furthermore, the star projector comprises the second motor 62, the first grating sheet 011, the second grating sheet 012 and the laser diode 202. The power output end of the second motor 62 is connected with the second grating sheet 012, so as to drive the second grating sheet 012 to rotate; the light beam emitted by the laser diode 202 sequentially passes through the first grating sheet 011 and a portion of the second grating sheet 012 which is rotating, so as to produce the projection of stars which are moving. The second motor 62 is controlled by the motor control unit 7, the motor control unit 7 controls the rotation speed and the rotation period of the second motor 62; the motor control unit 7 controls the second motor 62 to adjust the movement speed of stars in the projection of stars. The laser diode 202 is controlled by the second light source control unit 82, the second light source control unit 82 controls the laser diode 202 to adjust brightness of the stars in the projection of stars. The light beam generated by the laser diode 202 irradiates onto the first grating sheet 011, so as to form a plurality of relatively large light beams of the projection of stars, the light beams of the projection of stars irradiates onto a portion of the second grating sheet 012 directly facing to the first grating sheet 011; the second motor 62 drives the second grating sheet 012 to rotate to form a dynamic projection of stars.

Embodiment 15

Figure 15:
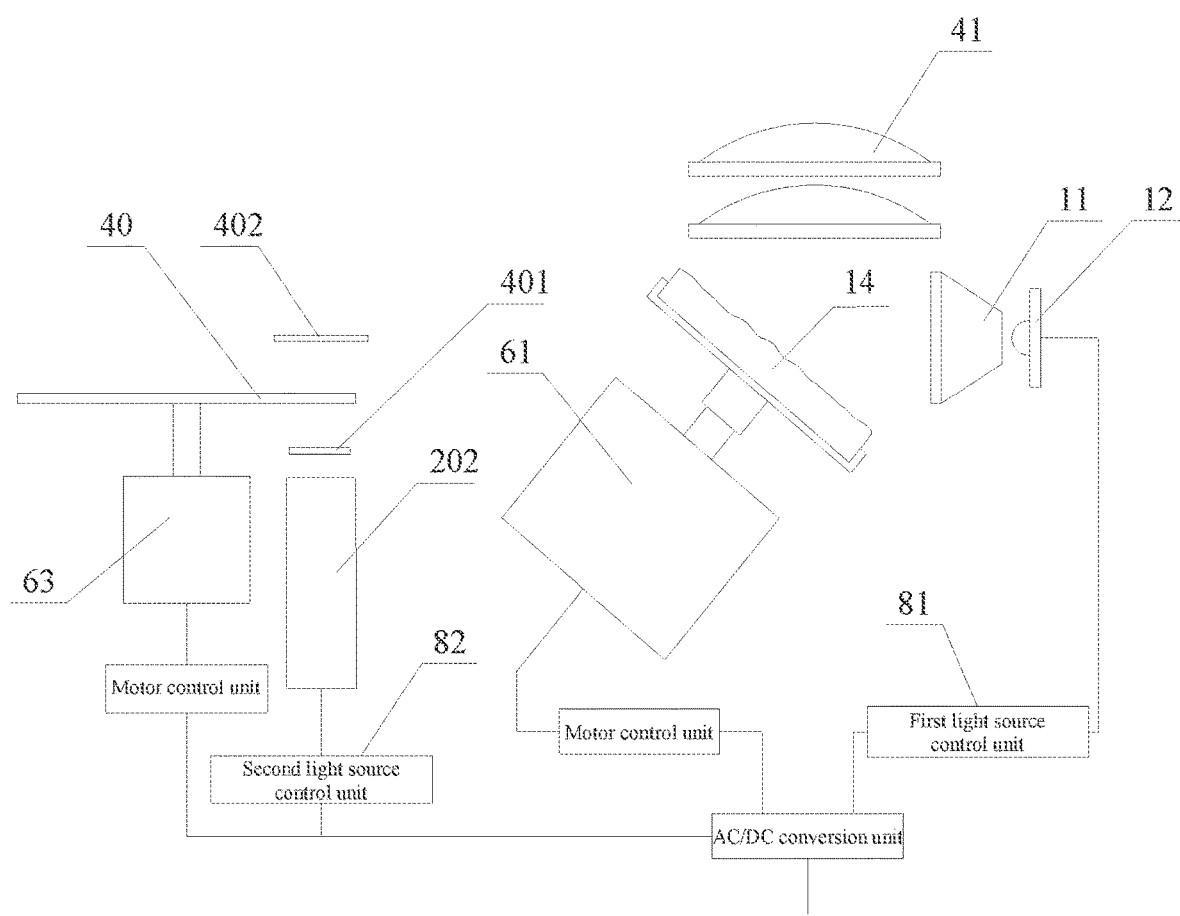
FIG. 15 is a schematic structural diagram of a lamp projecting a starry sky provided in Embodiment 15 of the present invention.

As shown in FIG. 15, the lamp projecting a starry sky provided in the embodiment comprises: at least one beam generator; a reflecting member 14, a reflecting surface of the reflecting member 14 is uneven and irregular; a first motor 61 connected to the reflecting member 14 through a connecting shaft, the reflecting member 14 is driven to rotate when the first motor 61 rotates; the beam generator is placed on a first side of the reflecting member 14, a light beam generated by the beam generator irradiates onto the first side of the reflecting member 14 along an incident light path; at least one first lens 41, located on an emergent light path of the reflecting member 14; the light beam emitted from the reflecting member 14 forms a moving and layering nebula projection after passing through the at least one first lens 41. The lamp projecting a starry sky provided in the present embodiment further comprises: the third motor 63, the hole-shaped light blocking sheet 40, the third grating sheet 401, the fourth grating sheet 402 and the laser diode 202; the power output end of the third motor 63 is connected with the hole-shaped light blocking sheet 40, so as to drive the hole-shaped light blocking sheet 40 to rotate; a plurality of circular holes 403 are arranged on the hole-shaped light blocking sheet 40. The light beam emitted by the laser diode 202 sequentially passes through the third grating sheet 401, the hole-shaped light blocking sheet which is rotating 40, and the fourth grating sheet 402; wherein a plurality of light beams are formed after passing through the third grating sheet 401, the plurality of circular holes 403 arranged on the hole-shaped light blocking sheet 40 make a portion of the circular hole 403 be blocked, in this case, the fourth grating sheet 402 can only split the light beams that are not blocked, so as to form the projection of stars, due to the blocking, the projection of stars which are twinkling is generated on the fourth grating sheet 402. Furthermore, the lamp projecting a starry sky further comprises the motor control unit 7 for controlling the rotation speed and the rotation period of the third motor 63; the motor control unit 7 controls the third motor 63 to adjust the twinkling frequency of stars in the projection of stars. More preferably, the lamp projecting a starry sky further comprises the fourth motor; the fourth motor drives the third grating sheet 401 and/or the fourth grating sheet 402 to rotate; the light beam emitted by the laser diode 202 sequentially passes through the third grating sheet 401 which is rotating, the hole-shaped light blocking sheet 40 which is rotating, and the fourth grating sheet 402, so as to produce the projection of stars which are twinkling and rotating; or the light beam emitted by the laser diode 202 sequentially passes through the third grating sheet 401, the hole-shaped light blocking sheet 40 which is rotating, and the fourth grating sheet 402 which is rotating, so as to produce the projection of stars which are twinkling and moving. Since the lamp projecting a starry sky provided in the present embodiment has both the hole-shaped light blocking sheet 40 and the grating sheet which is rotating, some stars in the projection of stars which are moving are blocked, finally forming the projection of stars which are twinkling and moving.

Embodiment 16

Figure 16:
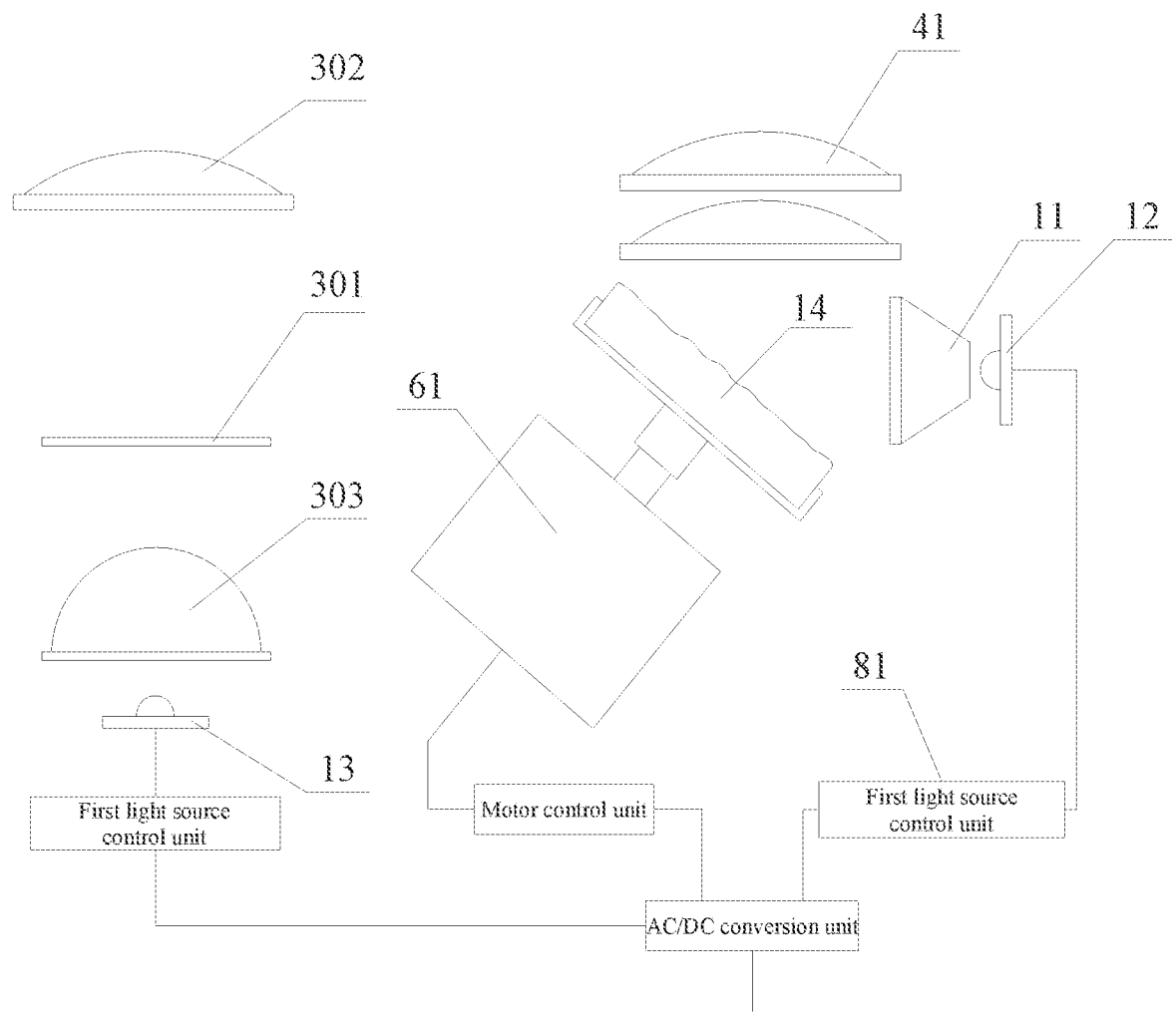
FIG. 16 is a schematic structural diagram of a lamp projecting a starry sky provided in Embodiment 16 of the present invention.

As shown in FIG. 16, the lamp projecting a starry sky provided in the embodiment comprises: at least one beam generator; a reflecting member 14, a reflecting surface of the reflecting member 14 is uneven and irregular; a first motor 61 connected to the reflecting member 14 through a connecting shaft, the reflecting member 14 is driven to rotate when the first motor 61 rotates; the beam generator is placed on a first side of the reflecting member 14, a light beam generated by the beam generator irradiates onto the first side of the reflecting member 14 along an incident light path; at least one first lens 41, located on an emergent light path of the reflecting member 14; the light beam emitted from the reflecting member 14 forms a moving and layering nebula projection after passing through the at least one first lens 41. The lamp projecting a starry sky provided in the present embodiment further comprises: the image projector for producing images; images generated by the star projector are projected on a nebula projection or a starry sky projection, so as to form the nebula projection or the starry sky projection with images. Furthermore, the image projector comprises the slide 301 for generating images, the at least one second lens 302, the condensing lens 303 and the second light source 13. The light generated by the second light source 13 generates the light beam after light condensing action of the condensing lens 303, the light beam irradiates onto the slide 301 and is enlarged by the at least one second lens 302 to form images. The second light source 13 is controlled by the light source control unit 8, the light source control unit 8 controls the switch and light intensity of the second light source 13, the focal point of the at least one second lens 302 is preferably located on a side of the slide 301, in order to properly control the distance between the at least one second lens 302 and the slide 301. The light generated by the second light source 13 generates the light beam after light condensing action of the condensing lens 303, the light beam irradiates onto the slide 301 to form image projections. Images on the slide 301 can be customized by users, such as: a moon image, an image of Chang'e flying to the moon, the Milky Way, etc.

Embodiments 17-19

Figure 17:
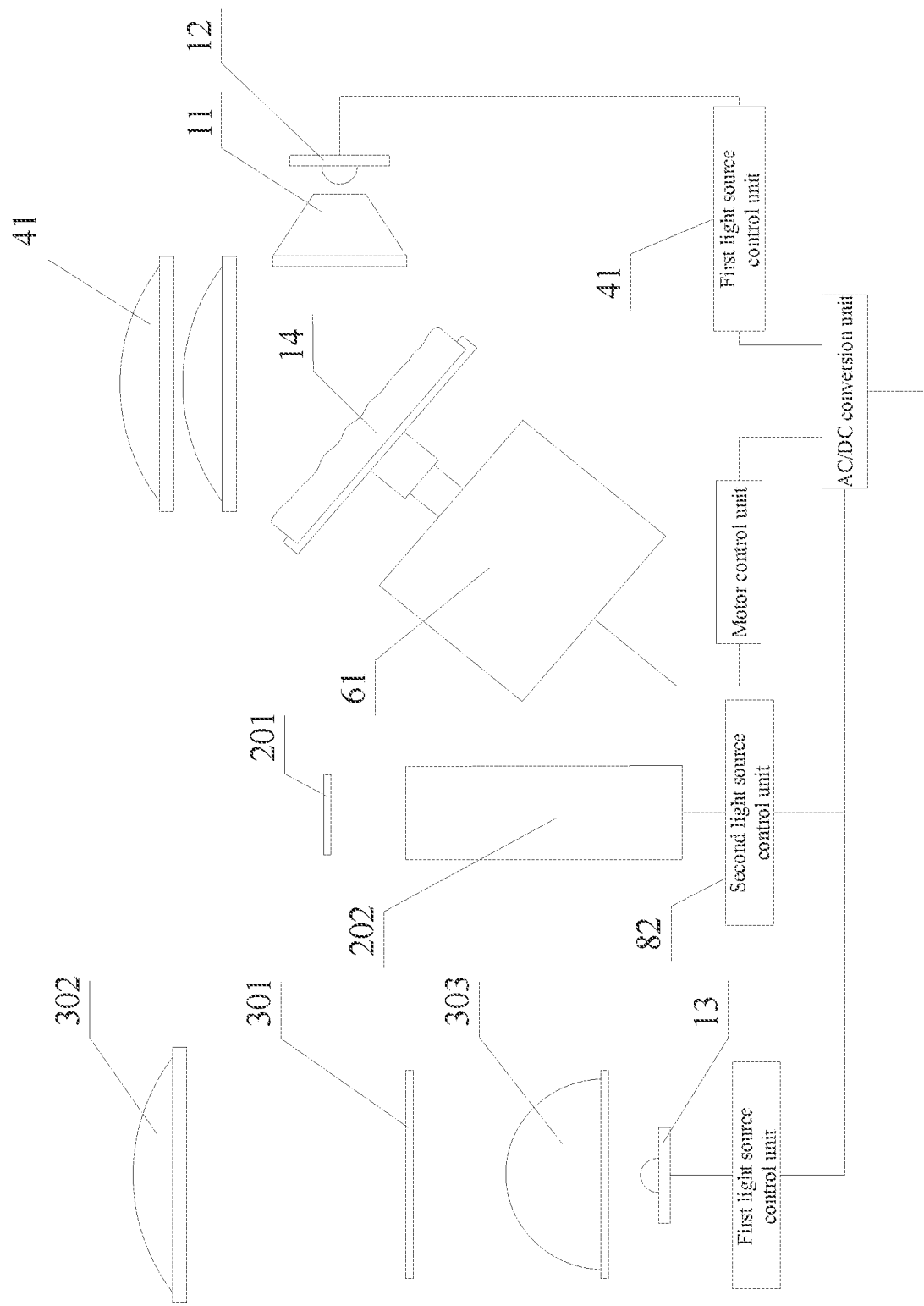
FIG. 17 is a schematic structural diagram of a lamp projecting a starry sky provided in Embodiment 17 of the present invention.
Figure 18:
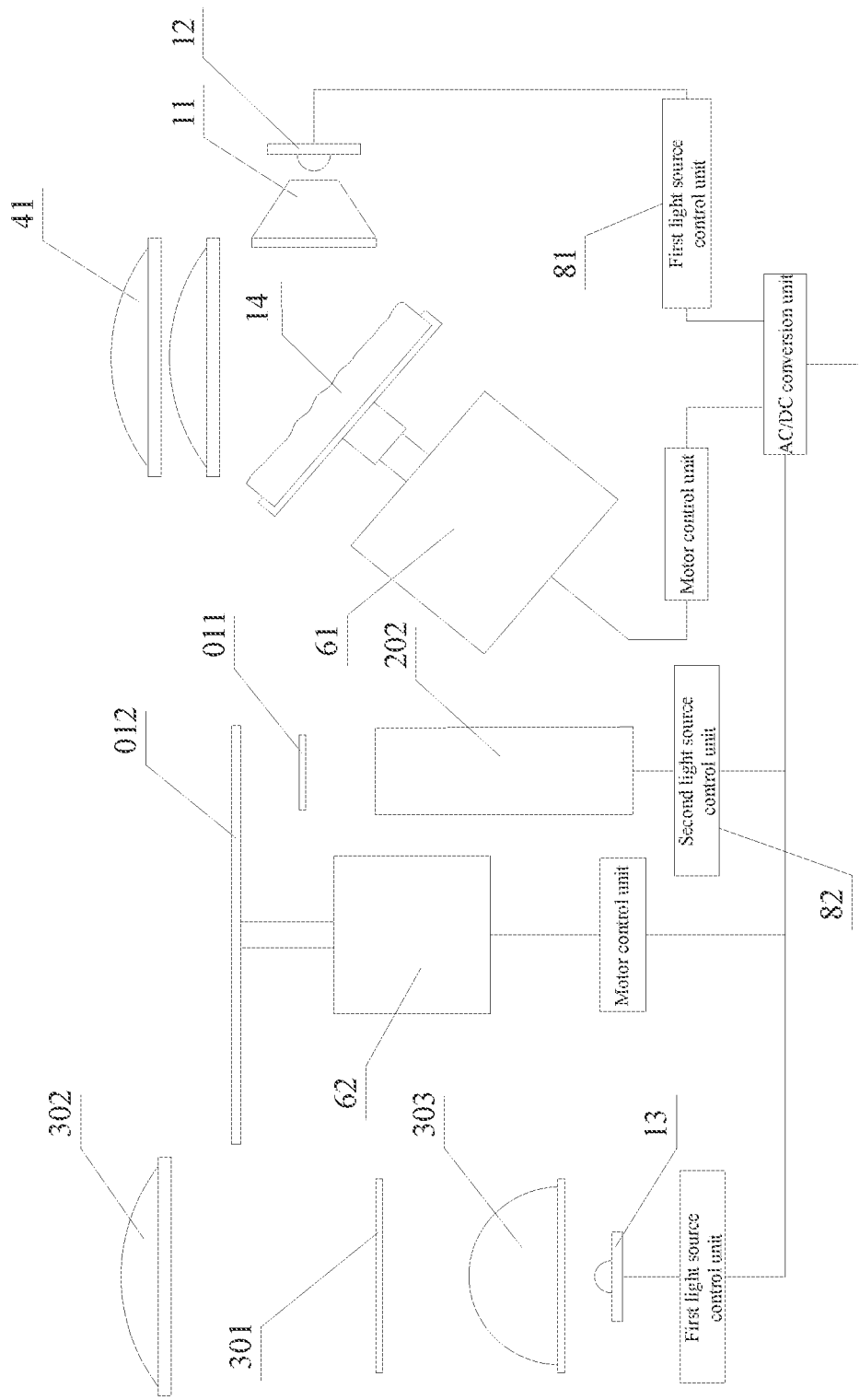
FIG. 18 is a schematic structural diagram of a lamp projecting a starry sky provided in Embodiment 18 of the present invention.
Figure 19:
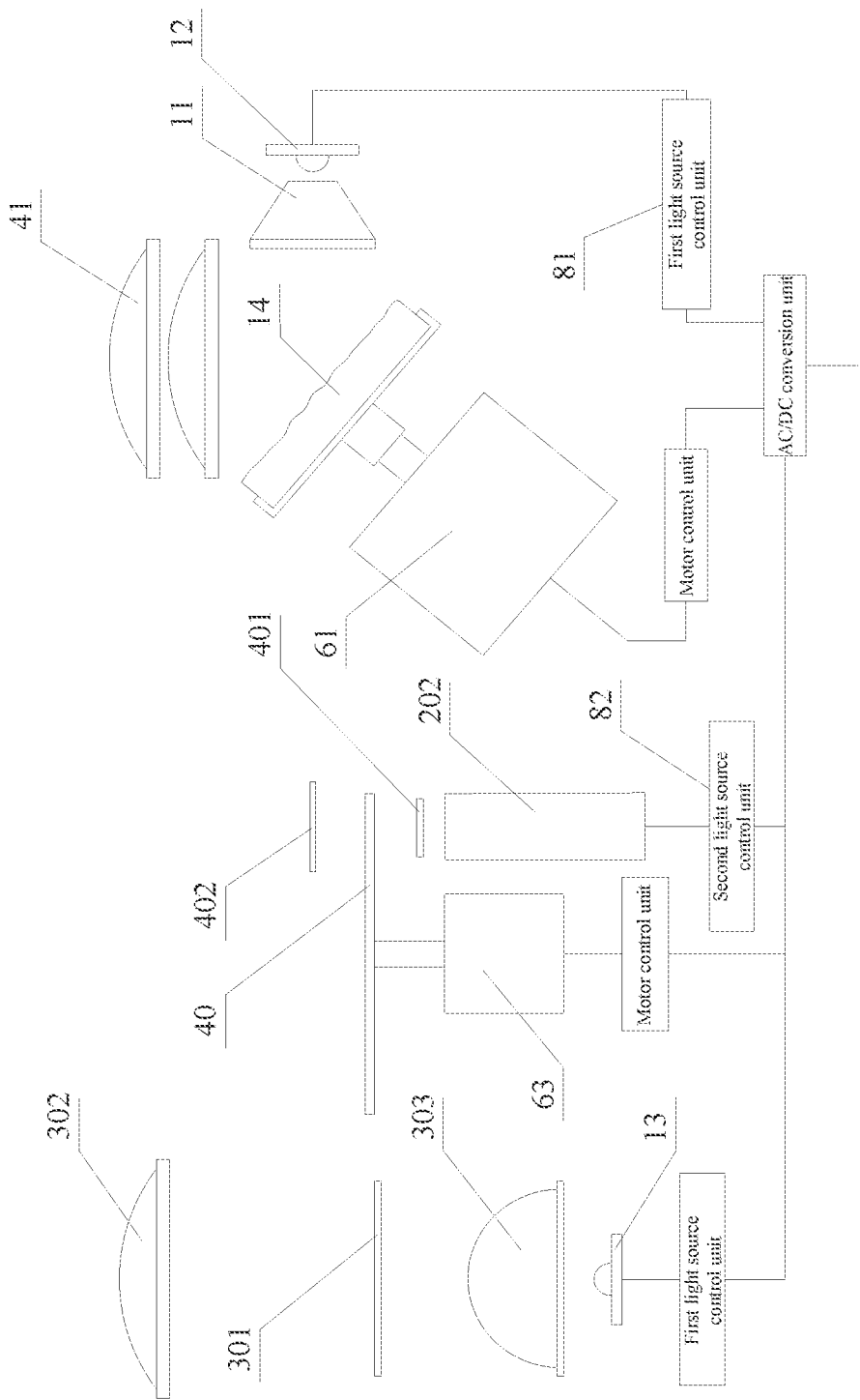
FIG. 19 is a schematic structural diagram of a lamp projecting a starry sky provided in Embodiment 19 of the present invention.

Embodiment 17 (as shown in FIG. 17) can be formed by combining Embodiment 11, Embodiment 13 and Embodiment 16, and Embodiment 17 can project the layering nebula projection, the static projection of stars, and static images; Embodiment 18 (as shown in FIG. 18) can be formed by combining Embodiment 11, Embodiment 14 and Embodiment 16, and Embodiment 18 can project the layering nebula projection, the dynamic projection of stars, and static images; Embodiment 19 (as shown in FIG. 19) can be formed by combining Embodiment 11, Embodiment 15 and Embodiment 16, and Embodiment 19 can project the layering nebula projection, the projection of stars which are twinkling, and static images; these three situations are common combination scenarios of the foregoing embodiments, and in fact, a personalized combination can be customized according to customer needs.

Embodiment 20

A nebula generation method for the lamp projecting a starry sky provided in Embodiment 20 is implemented according to the following steps:

Step S00: the first motor driving the reflecting member 14, which is used to produce nebula effect, to rotate;

Step S10: a light beam generated by the beam generator irradiating onto the first side of the reflecting member 14 which is rotating;

Step S20: the light beam emitted from the first side of the reflecting member 14 forming a moving and layering nebula projection after passing through the at least one first lens 41, and projecting the nebula projection onto a projected body, forming the layering nebula projection showing a three-dimensional sense. In this case, the projected body is configured to be an object that can be clearly projected, such as a wall or a curtain.

The present invention is described through preferred embodiments, those skilled in the art will understand that various modifications or equivalent substitutions can be made to these features and embodiments, without departing from the spirit and scope of the present invention. The present invention is not limited to the specific embodiments disclosed therein, and other embodiments falling into the scope of claims of the application are within the protection scope of the present invention.

What is claimed is:

1. A lamp projecting a starry sky, comprising:
   a beam generator;
   a reflecting member, wherein a reflecting surface of the reflecting member is uneven and irregular;
   a first motor, wherein the first motor is connected to the reflecting member through a connecting shaft, and the reflecting member is driven to rotate when the first motor rotates; and
   at least one first lens, wherein the at least one first lens is located on an emergent light path of the reflecting member;
   wherein the beam generator is placed on a first side of the reflecting member, and a light beam generated by the beam generator irradiates onto the first side of the reflecting member along an incident light path;
   the light beam emitted from the reflecting member forms a moving and layering nebula projection after passing through the at least one first lens; and
   a focal point of the at least one first lens is located on the first side of the reflecting member.

2. The lamp projecting the starry sky according to claim 1, wherein,
   the beam generator comprises a first light source and a condenser cup; and a light generated by the first light source generates the light beam after a light condensing action of the condenser cup, and the light beam irradiates onto the first side of the reflecting member along the incident light path.

3. The lamp projecting the starry sky according to claim 2, further comprising:
a first light source control unit;
wherein the first light source control unit is configured to control light intensity of the first light source; and
the first light source control unit controls the first light source to adjust brightness of a nebula in the moving and layering nebula projection.

4. The lamp projecting the starry sky according to claim 2, wherein,
a central axis of the condenser cup is perpendicular to a central axis of the at least one first lens;
an angle between a central axis of the reflecting member and the central axis of the at least one first lens is 30°-50°; and
a projection of an incident light beam is located at a lower part of the first side of the reflecting member, a projection of an emergent light beam is located at an upper part of the first side of the reflecting member, and the at least one first lens is located on the emergent light beam.

5. The lamp projecting the starry sky according to claim 1, further comprising:
a star projector;
wherein the star projector is configured to produce a star effect; and
a projection of stars generated by the star projector is projected on the moving and layering nebula projection to form a starry sky projection.

6. The lamp projecting the starry sky according to claim 5, wherein,
the star projector comprises a grating sheet and a laser diode;
wherein a light beam generated by the laser diode is projected on the grating sheet to produce the projection of stars.

7. The lamp projecting the starry sky according to claim 6, wherein,
the star projector comprises a third motor, a hole-shaped light blocking sheet, a third grating sheet, a fourth grating sheet and the laser diode;
wherein a power output end of the third motor is connected with the hole-shaped light blocking sheet to drive the hole-shaped light blocking sheet to rotate; and
the light beam emitted by the laser diode sequentially passes through the third grating sheet, the hole-shaped light blocking sheet which is rotating, and the fourth grating sheet to produce the projection of the stars which are twinkling.

8. The lamp projecting the starry sky according to claim 7, further comprising:
a motor control unit;
wherein the motor control unit is configured to control a rotation speed and a rotation period of the third motor; and
the motor control unit controls the third motor to adjust a twinkling frequency of the stars in the projection of the stars.

9. The lamp projecting the starry sky according to claim 7, further comprising:
a fourth motor;

wherein the fourth motor drives the third grating sheet and/or the fourth grating sheet to rotate;
the light beam emitted by the laser diode sequentially passes through the third grating sheet which is rotating, the hole-shaped light blocking sheet which is rotating, and the fourth grating sheet, to produce the projection of the stars which are twinkling and rotating; or
the light beam emitted by the laser diode sequentially passes through the third grating sheet, the hole-shaped light blocking sheet which is rotating, and the fourth grating sheet which is rotating, to produce the projection of the stars which are twinkling and moving.

10. The lamp projecting the starry sky according to claim 1, further comprising:
an image projector;
wherein the image projector is configured to produce images;
images generated by the star projector are projected on the moving and layering nebula projection or a starry sky projection to form the moving and layering nebula projection with the images or the starry sky projection with the images.

11. The lamp projecting the starry sky according to claim 10, wherein,
the image projector comprises a slide for generating the images, at least one second lens, a condensing lens and a second light source;
wherein a light generated by the second light source generates the light beam after a light condensing action of the condensing lens, and the light beam irradiates onto the slide and is enlarged by the at least one second lens to form the images.

12. The lamp projecting the starry sky according to claim 1, further comprising:
an alternating current (AC)/direct current(DC) conversion unit;
wherein the AC/DC conversion unit supplies power to a motor control unit and a light source control unit after being rectified by a rectifier circuit of the AC/DC conversion unit.

13. The lamp projecting the starry sky according to claim 1, wherein,
the reflecting member comprises a reflecting disk with an uneven and irregular surface and a mirror-coated film provided on the uneven and irregular surface; or,
the reflecting member is a reflecting mirror with an uneven and irregular surface.

14. A nebula generation method for the lamp projecting the starry sky according to claim 1, comprising the following steps:
S00: the first motor driving the reflecting member, which is used to produce the nebula effect, to rotate;
S10: the light beam generated by the beam generator irradiating onto the first side of the reflecting member which is rotating; and
S20: the light beam emitted from the first side of the reflecting member forming the moving and layering nebula projection after passing through the at least one first lens, and projecting the moving and layering nebula projection onto a projected body.

15. A lamp projecting a starry sky, comprising:
a beam generator;
a reflecting member, wherein a reflecting surface of the reflecting member is uneven and irregular;

a first motor, wherein the first motor is connected to the reflecting member through a connecting shaft, and the reflecting member is driven to rotate when the first motor rotates;

at least one first lens, wherein the at least one first lens is located on an emergent light path of the reflecting member; and a fixed cylinder connected to first motor;

wherein the beam generator is placed on a first side of the reflecting member, and a light beam generated by the beam generator irradiates onto the first side of the reflecting member along an incident light path;

the light beam emitted from the reflecting member forms a moving and layering nebula projection after passing through the at least one first lens;

the reflecting member is fixed at an opening at one end of the fixed cylinder, the connecting shaft connected to the first motor is connected with a slot bottom of the fixed cylinder; and when the first motor runs, the fixed cylinder rotates to drive the reflecting member to rotate.

16. The lamp projecting the starry sky according to claim 15, further comprising:

a motor control unit;

wherein the motor control unit is configured to control a rotation speed and a rotation period of the first motor; and the motor control unit controls the first motor to adjust a movement speed of a nebula in the moving and layering nebula projection.

17. A lamp projecting a starry sky, comprising:

a beam generator;

a reflecting member, wherein a reflecting surface of the reflecting member is uneven and irregular;

a first motor, wherein the first motor is connected to the reflecting member through a connecting shaft, and the reflecting member is driven to rotate when the first motor rotates;

at least one first lens, wherein the at least one first lens is located on an emergent light path of the reflecting member; and a star projector;

wherein the beam generator is placed on a first side of the reflecting member, and a light beam generated by the beam generator irradiates onto the first side of the reflecting member along an incident light path;

wherein the light beam emitted from the reflecting member forms a moving and layering nebula projection after passing through the at least one first lens, wherein the star projector is configured to produce a star effect;

wherein a projection of stars generated by the star projector is projected on the moving and layering nebula projection to form a starry sky projection;

wherein the star projector comprises a grating sheet and a laser diode;

wherein a light beam generated by the laser diode is projected on the grating sheet to produce the projection of stars;

wherein the star projector comprises a second motor, a first grating sheet, a second grating sheet and the laser diode;

wherein a power output end of the second motor is connected with the second grating sheet to drive the second grating sheet to rotate; and wherein the light beam emitted by the laser diode sequentially passes through the first grating sheet and a portion of the second grating sheet which is rotating, to produce the projection of stars which are moving.

18. The lamp projecting the starry sky according to claim 17, further comprising:

a motor control unit;

wherein the motor control unit is configured to control a rotation speed and a rotation period of the second motor; and the motor control unit controls the second motor to adjust a movement speed of the stars in the projection of the stars.

19. The lamp projecting the starry sky according to claim 17, further comprising:

a second light source control unit;

wherein the second light source control unit is configured to control the laser diode; and the second light source control unit controls the laser diode to adjust brightness of the stars in the projection of the stars.

* * * * *